(12) United States Patent
Hill et al.

(10) Patent No.: US 7,185,867 B2
(45) Date of Patent: Mar. 6, 2007

(54) VEHICLE SEAT SUSPENSION AND METHOD

(75) Inventors: Kevin Hill, Mequon, WI (US); Bruce Dahlbacka, Port Washington, WI (US)

(73) Assignee: Milsco Manufacturing Company, a unit of Jason Incorporated, Milwaukee, WI (US)

( * ) Notice: Subject to any disclaimer, the term of this patent is extended or adjusted under 35 U.S.C. 154(b) by 0 days.

(21) Appl. No.: 10/715,271

(22) Filed: Nov. 15, 2003

(65) Prior Publication Data

US 2004/0144906 A1 Jul. 29, 2004

Related U.S. Application Data

(60) Provisional application No. 60/426,957, filed on Nov. 15, 2002.

(51) Int. Cl.
*F16M 13/00* (2006.01)

(52) U.S. Cl. ............... 248/421; 248/406.2; 297/344.12

(58) Field of Classification Search ............... 248/421, 248/550, 406.2, 574, 555, 588, 624, 631, 248/157; 297/344.12, 344.14, 344.15, 344.16
See application file for complete search history.

(56) References Cited

U.S. PATENT DOCUMENTS

| | | | |
|---|---|---|---|
| 3,109,621 A | 11/1963 | Radke et al. |
| 3,339,906 A | 9/1967 | Persson |
| 3,951,373 A | 4/1976 | Swenson et al. |
| 3,954,298 A | 5/1976 | Lowe |
| 3,994,469 A | 11/1976 | Swenson et al. |
| 4,029,283 A | 6/1977 | Swenson et al. |
| 4,029,284 A | 6/1977 | Swenson |
| 4,072,287 A | 2/1978 | Swenson et al. |
| 4,103,858 A | 8/1978 | Swenson |
| 4,125,242 A | 11/1978 | Meiller et al. |
| 4,222,555 A | 9/1980 | Eimen |
| 4,309,015 A | 1/1982 | Muhr |
| 4,344,597 A | 8/1982 | Eimen |
| 4,356,990 A | 11/1982 | Sakurada et al. |
| 4,448,386 A | 5/1984 | Moorhouse et al. |
| 4,533,110 A | 8/1985 | Hill |
| 4,558,648 A | 12/1985 | Franklin et al. |
| 4,561,621 A | 12/1985 | Hill |
| 4,593,875 A | 6/1986 | Hill |
| 4,611,783 A | 9/1986 | Sakamoto |
| 4,624,437 A | 11/1986 | Sakamoto |

(Continued)

FOREIGN PATENT DOCUMENTS

DE          3242287        5/1984

(Continued)

*Primary Examiner*—Korie Chan
(74) *Attorney, Agent, or Firm*—Boyle Fredrickson Newholm Stein & Gratz, S.C.

(57) ABSTRACT

A vehicle seat suspension that includes a suspension cartridge which houses suspension components that includes one or more of the following: one or more biasing elements, a suspension arm arrangement, a damper arrangement, a height adjust assembly, and a weight adjust assembly. In one preferred embodiment, the cartridge includes all of these. The suspension can include a truncated roller that provides a larger effect of radius. The suspension can also include a cam upon which a suspension roller rides that increases maximum suspension stroke while minimizing collapsed suspension height. The suspension can also include a damper that is oriented so as to provide a nearly linear response over all regions of suspension stroke or travel.

54 Claims, 11 Drawing Sheets

U.S. PATENT DOCUMENTS

| | | | |
|---|---|---|---|
| 4,640,488 A | 2/1987 | Sakamoto | |
| 4,662,597 A | 5/1987 | Uecker et al. | |
| 4,687,250 A | 8/1987 | Esche | |
| 4,709,963 A | 12/1987 | Uecker et al. | |
| 4,738,427 A | 4/1988 | Nishino | |
| 4,778,139 A | 10/1988 | Babbs | |
| 4,787,594 A | 11/1988 | Ikegaya et al. | |
| 4,838,514 A | 6/1989 | Hill | |
| 4,856,763 A | 8/1989 | Brodersen et al. | |
| 4,943,037 A | 7/1990 | Brodersen et al. | |
| 5,014,958 A | 5/1991 | Harney | |
| 5,050,852 A * | 9/1991 | Sawada et al. | 271/11 |
| 5,125,631 A | 6/1992 | Brodersen et al. | |
| 5,154,393 A | 10/1992 | Lorbiecki | |
| 5,154,402 A | 10/1992 | Hill et al. | |
| 5,169,112 A | 12/1992 | Boyles et al. | |
| 5,176,356 A | 1/1993 | Lorbiecki et al. | |
| 5,221,071 A | 6/1993 | Hill | |
| 5,364,060 A | 11/1994 | Donovan et al. | |
| 5,466,048 A | 11/1995 | Fowler et al. | |
| 5,580,027 A * | 12/1996 | Brodersen | 248/564 |
| 5,794,911 A | 8/1998 | Hill | |
| 5,927,679 A * | 7/1999 | Hill | 248/588 |
| 5,957,426 A * | 9/1999 | Brodersen | 248/588 |
| 5,967,471 A | 10/1999 | Borlinghaus et al. | |
| 5,984,410 A * | 11/1999 | Brodersen | 297/339 |
| 6,149,237 A | 11/2000 | Morishita et al. | |
| 6,286,819 B1 | 9/2001 | Milobinski et al. | |
| 6,464,193 B1 | 10/2002 | Nemoto | |
| 6,484,995 B1 | 11/2002 | Nemoto | |
| 6,572,065 B2 | 6/2003 | Koga et al. | |
| 6,776,384 B2 | 8/2004 | Igarashi | |
| 6,843,460 B2 | 1/2005 | Koga et al. | |

FOREIGN PATENT DOCUMENTS

| | | |
|---|---|---|
| EP | 0448340 | 9/1991 |
| GB | 930903 | 7/1963 |
| GB | 965072 | 7/1964 |
| GB | 1278921 | 6/1972 |
| GB | 1491291 | 11/1977 |
| GB | 1521316 | 8/1978 |
| WO | WO 90/11841 | 10/1990 |
| WO | WO 93/10996 | 6/1993 |

* cited by examiner

VEHICLE SEAT SUSPENSION AND METHOD

CROSS REFERENCE TO RELATED APPLICATION

This application claims priority from U.S. Provisional Patent Application Ser. No. 60/426,957, which was filed on Nov. 15, 2002, the entirety of which is expressly incorporated herein.

FIELD OF INVENTION

The present invention is directed to a vehicle seat suspension and more particularly to a vehicle seat suspension that is well-suited for use in off-road vehicles.

BACKGROUND OF INVENTION

Most manufacturers of seat suspensions have sold, or are currently selling, a conventional bell crank mechanical suspension system. The main components of this type of seat suspension typically include:

Two support brackets welded to the top plate (e.g. the seat platform);
Two extension springs;
A welded bell crank sub-assembly that includes two bell crank arms, a bearing tube between the two bell crank arms, and a spring mounting shaft fixed to the bell crank arms;
A spring hanger bracket;
A tension adjust shaft;
A knob attached to the tension adjust shaft;
Two flanged bearings inserted into the tube;
A pin attaching the bell crank assembly to support brackets and e-rings at both ends; and
A roller attached to the bell crank assembly with a pin and e-rings at each ends.

The above components are generally assembled at the same time as a complete seat suspension. Thus, the above components are also assembled at the same place as the rest of the seat suspension.

The invention and background for the invention relates to seat suspensions disclosed in commonly owned U.S. Pat. No. 5,794,911, which issued in August of 1998, and U.S. Pat. No. 5,927,679, which issued July of 1999, wherein a suspension height or vertical adjust mechanism acts independent from that of the suspension weight adjustment or energy mechanism.

Traditional means for providing such height and weight adjustment functionality is that of loose members being systematically fixed to a partially assembled seat suspension, comprised of a top and bottom plate and connected linkage capable of lifting the top plate in a vertical fashion with respect to the bottom plate. This means of assembly limits the design of the energy and vertical adjust components to that of elements that can be installed and assembled as loose members to the seat suspension in the restricted space available between the seat platform and base. Thus, no prevailing interference points can exist within the suspension between the platform and base as the vertical adjust and energy adjustment components are systematically assembled to the suspension. This constraint may require additional space within the suspension envelope. This can result in, for example, taller collapsed height or wider linkage between plates than necessary. It may also require specialized tools for assembly. The traditional embodiment may require additional components that provide unnecessary redundancy at increased cost to attach the vertical adjust and energy adjust components.

One typical approach of providing height adjust in a conventional bell crank suspension is an adjustable up-stop. A mechanical device is adjusted to provide two or more positions that each provides a different limit for the upward travel of the suspension linkage. In order for an operator or seat occupant to change their static vertical position they also need to either increase or decrease the spring tension adjustment, which typically requires a significant expenditure of work or energy. Moving the up-stop has no effect on the operator's vertical position because the up-stop adjustment does not decrease or increase the preload of the springs. Without changing the spring preload with the weight adjustment control, the operator will return to the same static vertical position regardless of the up-stop setting. Thus, two adjustments disadvantageously must be made to change the operator's vertical position.

Damping in compact suspensions is typically achieved by connecting the damper between the upper and lower housings, e.g., connecting the damper between the base and platform. This arrangement produces nonlinear damping characteristics. The effective damping force acting to isolate the operator significantly decreases as the suspension collapses. This is an undesirable behavior for effective vibration isolation.

Another shortcoming of conventional compact bell crank suspensions is compromised vibration isolation. The compact size limits the optimization of the bell crank leverage ratio, which results in higher spring rates, higher joint loads, and therefore more system friction.

What is needed is a seat suspension that overcomes one or more of these deficiencies. What is also needed is a seat suspension that better facilitates assembly and installation. What is further needed is a seat suspension of simple design that has a minimum of components so as to simplify assembly and installation while reducing cost. What is still further needed is a seat suspension of compact construction that results in a shorter collapse height.

SUMMARY OF INVENTION

The present invention is directed to a suspension arrangement for a seat that preferably is a vehicle seat, namely, an off-road vehicle seat. The present invention is directed to a vehicle seat suspension arrangement that includes a seat base and a seat platform. The seat platform is capable of supporting a vehicle seat that can be adjustably mounted. The seat base preferably is coupled to ground such as by being carried by a vehicle frame.

A suspension arrangement is disposed in communication with the base and platform. For example, in one preferred embodiment, a suspension arrangement of the invention is located below a seat platform and above a seat base. The suspension arrangement can be carried either by the base or the platform. For example, where the suspension arrangement is located between the base and the platform, a portion of the suspension arrangement can be fixed or otherwise attached to the platform or the base. In a currently preferred embodiment, the suspension arrangement is releasably coupled to the seat platform, such as by a plurality of fasteners, each of which preferably comprises a rivet or the like.

The suspension arrangement includes a suspension arm that is coupled to a biasing element that cooperate to oppose suspension collapse. In a currently preferred embodiment, suspension motion is constrained in an up-and-down direction by including a scissors linkage arrangement. Where a scissors linkage arrangement is included, the scissors linkage arrangement has a plurality of scissor arms that each have one end in communication with the base and another end in communication with the platform. In a currently preferred embodiment, the scissors linkage arrangement has two pairs of spaced apart scissor arms both pairs of which are disposed in between the base and the platform.

The suspension arm arrangement is pivotally carried by a suspension housing. Preferably, the suspension arm arrangement includes a shaft to which at least one biasing element is coupled. The suspension arm arrangement also includes a roller that is carried at or adjacent one end of the arm. The roller can bear directly against either the platform or the base. In a currently preferred embodiment, the suspension arrangement is carried by one of the platform and the base and the roller bears against the other one of the platform and the base.

The suspension housing preferably is part of a suspension cartridge that can be releasably attached to either the platform or the base. In a currently preferred embodiment the suspension housing is fixed to the platform by a plurality of fasteners, each of which preferably comprises a rivet or the like. The housing preferably carries a plurality of spaced apart and parallel biasing elements, each of which preferably comprises a coil spring that is held captive in tension.

While the suspension arm arrangement can comprise a scissors linkage arrangement, it preferably comprises a bell crank subassembly. The bell crank subassembly includes a plurality of bell crank arms that are each connected by a pivot shaft to the suspension housing. Also attached to the bell crank arms is a biasing element retainer shaft that releasably receives and retains one end of each biasing element. Also attached to the bell crank arms is an axle shaft to which the roller is pivotally mounted.

The bell crank subassembly preferably communicates with an adjust subassembly that is capable of enabling suspension adjustment. For example, the adjust subassembly can be constructed and arranged so as to provide height adjustment, weight adjustment, or height and weight adjustment.

In a currently preferred embodiment, the adjust assembly is constructed and arranged to provide the ability to make height and weight related adjustments to the suspension. The adjust assembly includes a handle that is linked or coupled to an adjuster rod that communicates with at least one of the biasing elements and that communicates with the suspension arm arrangement. In a currently preferred embodiment, the adjust assembly is linked or coupled to a biasing element hanger assembly that receives and retains one end of each biasing element. Preferably, the adjust assembly is linked or coupled to the biasing element hanger assembly by the adjuster rod.

Where the adjust assembly is designed to provide height adjustment, the adjuster rod is coupled at one end to the biasing element retainer shaft in manner that moves each biasing element without changing biasing element preload. Where the adjust assembly is designed to provide weight adjustment, the adjuster rod is rotatively coupled to the biasing element hanger assembly so as to be able to selectively increase or decrease the distance between the biasing element hanger assembly and the biasing element retainer shaft. Selectively increasing or decreasing the distance between the biasing element hanger assembly and the biasing element retainer shaft changes biasing element preload.

While the adjust assembly preferably includes at least one handle, each handle preferably can comprise a knob or a lever, if desired. Where the adjust assembly provides both height and weight adjustment, there are a plurality of handles that each preferably comprise a knob. If desired, some other type of handle can be used to perform seat height and weight adjustment.

The suspension housing is constructed and arranged to carry the components of the suspension arrangement. The suspension housing can be substantially tubular in construction. The suspension housing includes a slot in each sidewall that receives and guides the biasing element hanger assembly. To facilitate assembly, at least one slide preferably includes a clearance notch or the like that permits the biasing element hanger assembly to be slid sideways during assembly through the notch and slot in a manner where it remains captive in the slot. The suspension housing also preferably includes a pair of guide notches in an end of each sidewall. Each guide notch releasably receives and retains a portion of the biasing element retainer shaft therein. In a currently preferred embodiment, each sidewall end has a pivot shaft receiving notch formed therein that also facilitates assembly. In one preferred embodiment, the other end of the housing has an end wall. In another preferred embodiment, the other end of the housing is capped by an end cap.

In assembly, the suspension arm assembly and the adjust assembly are linked by a coupler that preferably includes a coupling sleeve and a coupling clip. The sleeve preferably includes a pair of spaced apart bores that each receives one clip end. The clip preferably includes a loop or the like that helps substantially rigidly couple the adjuster shaft to the bell crank subassembly, where a bell crank suspension arrangement is employed.

The sleeve preferably has a first diameter that receives the adjuster rod and a second diameter that receives a shaft that couples with the biasing element retainer shaft. In one preferred embodiment, the shaft that couples with the biasing element retainer shaft comprises a piston rod that reciprocably extends outwardly from a housing of a damper. In a currently preferred embodiment, where a damper is employed, the damper can be located within the housing and between the biasing elements. In another preferred embodiment, a damper can be carried by a suspension arm of the suspension arm arrangement.

Where a damper is carried by the suspension cartridge housing, the damper preferably advantageously has a substantially linear damping effectiveness curve (i.e., damper velocity ratio versus suspension deflection). In a preferred embodiment, the damper is oriented in a fore-aft direction and parallel with the biasing elements, producing a damping effectiveness curve with an increasing slope as suspension deflection or travel increases.

The roller is rotatively carried by a suspension arm of the suspension arm subasssembly. The suspension arm preferably has a pair of roller stops formed therein. Each roller stop limits the extent of rotation of the roller by engaging the roller when it reaches the desired rotational limit. In a currently preferred embodiment, there is a pair of suspension arms and each suspension arm has a plurality of roller stops formed therein.

While the roller can be circular in construction, it preferably has an angular extent of less than 360° such that it is truncated. In one preferred embodiment, the roller is a truncated roller that rotates when it rolls back and forth. In one preferred embodiment the truncated roller has an angular extent between 30° and 270°.

The truncated roller preferably is equipped with a curvilinear contact section that rotates during suspension operation. To help prevent over rotation or improper truncated roller positioning, the truncated roller can be equipped with a flat adjacent each end of the curvilinear contact section. Such a flat helps properly reorient the contact section should it become improperly oriented during assembly or suspension operation. Where additional measures are desired to help maintain proper truncated roller orientation, each flat can include at least one tang outwardly extending therefrom.

Where additional suspension stroke is desired, the roller can ride on a cam. In one preferred embodiment, the cam comprises a discrete component that is fixed to the platform or the base opposite the suspension arrangement. If desired, the cam can be integrally formed into the platform or the base.

In a currently preferred embodiment, the cam comprises a ramp that preferably has a generally triangular or cross-section. If desired, all or part of the cam can have a roller contact surface that is substantially flat but linearly elevating relative to the platform or the base that carries the cam. If desired, the contact surface of the cam can include a curvilinear section.

In the present invention, each biasing element preferably comprises a spring, the entire spring assembly (springs and hanger) is translated with respect to the housing and the fixed bell crank pivot which causes the bell crank to rotate about its pivot. The distance between the housing changes but the preload in the springs has not changed. Therefore, regardless of the initial distance between the upper and lower housings, the operator displacement downward from the unloaded condition remains constant. Thus, height adjustment advantageously operates independently of weight adjustment.

In at least one embodiment of the present invention, the introduction of the ramp enables a lower spring rate to be used by changing the vertical force component opposing the operator's mass due to the angle of the force imparted by the roller to the lower housing. By controlling the shape of the surface of the ramp, the load deflection characteristics of the suspension can be tuned to a certain degree. In any event, a suspension made in accordance with the presently invention preferably produces a compact suspension with a lower spring rate which in turn should also provide better vibration isolation.

In at least one embodiment of the present invention, by using a truncated roller having an increased diameter, suspension friction is reduced. The truncated roller advantageously also permits collapsed height to be smaller as compared to a fully round roller having the same diameter. Therefore, a truncated roller made in accordance with at least one aspect of the present invention achieves the advantage of a larger roller without adversely increasing collapsed suspension height by using a partial roller with features to assure that it stays in the desired orientation with respect to the ramp and the suspension housing.

The present invention has one or more of the following objectives, features and advantages:

It is an object of the present invention to provide a seat suspension that is capable of off-road vehicle use.

It is another object of the present invention to provide a seat suspension cartridge for a seat suspension.

It is another object of the present invention to provide a seat suspension that utilizes a suspension cartridge module that can be preassembled before being assembled to the rest of the suspension.

It is still another object of the present invention to provide a seat suspension that utilizes a truncated roller that is not completely circular but which can provide a larger effective radius for reducing and preferably minimizing friction between it and the surface against which it bears during suspension operation.

It is a further object of the present invention to provide a seat suspension that utilizes a cam against which a roller rides to increase suspension stroke.

It is a still further object of the present invention to provide a seat suspension that is capable of allowing height adjustment without affecting weight adjustment.

It is a still further object of the present invention to provide a seat suspension of compact construction that provides damping, height adjustment and weight adjustment.

It is another object of the invention to provide a seat suspension that is capable of allowing weight adjustment without affecting height adjustment.

It is another object of the invention to provide a bell crank seat suspension that is of low friction construction and which has a roller with a radius of at least 15 mm.

It is another object of the invention to provide a bell crank seat suspension of compact construction that has a lower spring rate than conventional bell crank suspensions and which provides better vibration isolation than conventional bell crank suspensions.

It is an advantage of the present invention to provide a seat suspension cartridge of modular, compact, robust, durable, reliable, repeatable and/or economical construction.

It is an advantage of the present invention to provide a seat suspension of modular construction that can be preassembled in one location and shipped to another location for final assembly to a seat suspension.

It is another advantage of the present invention to provide a seat suspension that utilizes a cam that has a cam surface that can be tailored to produce a particular desired load deflection suspension curve.

It is another advantage of the present invention to provide a seat suspension that utilizes a cam of inexpensive, durable, resilient, reliable, long-lasting, and/or repeatable construction.

It is a further advantage of the present invention to provide a bell crank seat suspension that is of compact and low friction construction.

It is a further advantage of the present invention that the biasing elements are manually attachable without requiring use of a spring puller or the like.

It is a still further advantage of the present invention that a suspension arrangement including a damper arrangement provides substantially linear damping characteristics.

It is an advantage of the present invention to provide a seat suspension that allows seat height adjustment without requiring a corresponding spring preload adjustment or weight adjustment.

It is another advantage of the present invention to provide a seat suspension having a damping element that is not connected to both the base and the platform.

It is still another advantage of the present invention to provide a seat suspension of compact construction having a damping element that lies in a fore-aft direction.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 1 is a perspective view of a first preferred embodiment of a vehicle seat suspension arrangement of the invention;

DETAILED DESCRIPTION OF AT LEAST ONE PREFERRED EMBODIMENT

Figure 2:
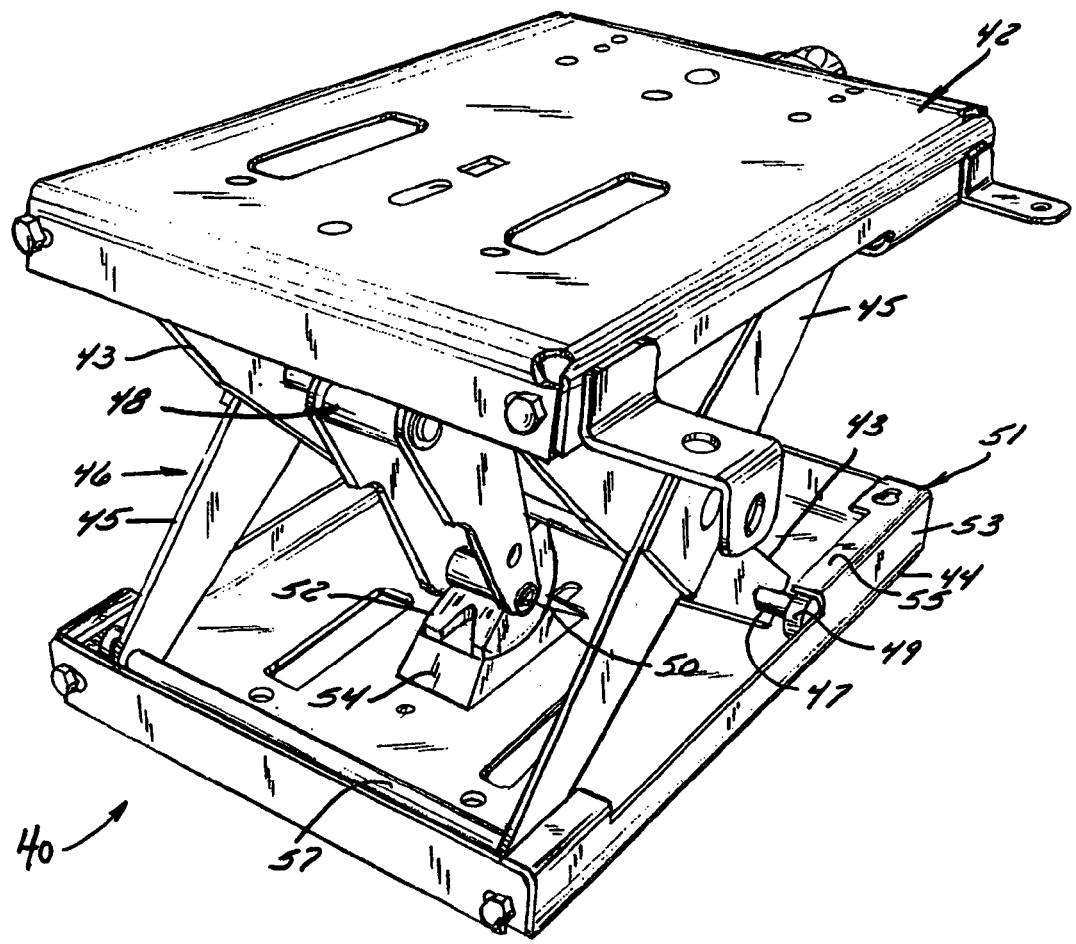
FIG. 2 is a top view of one preferred suspension cartridge embodiment that can be implemented as the suspension arrangement of the invention.
Figure 2:
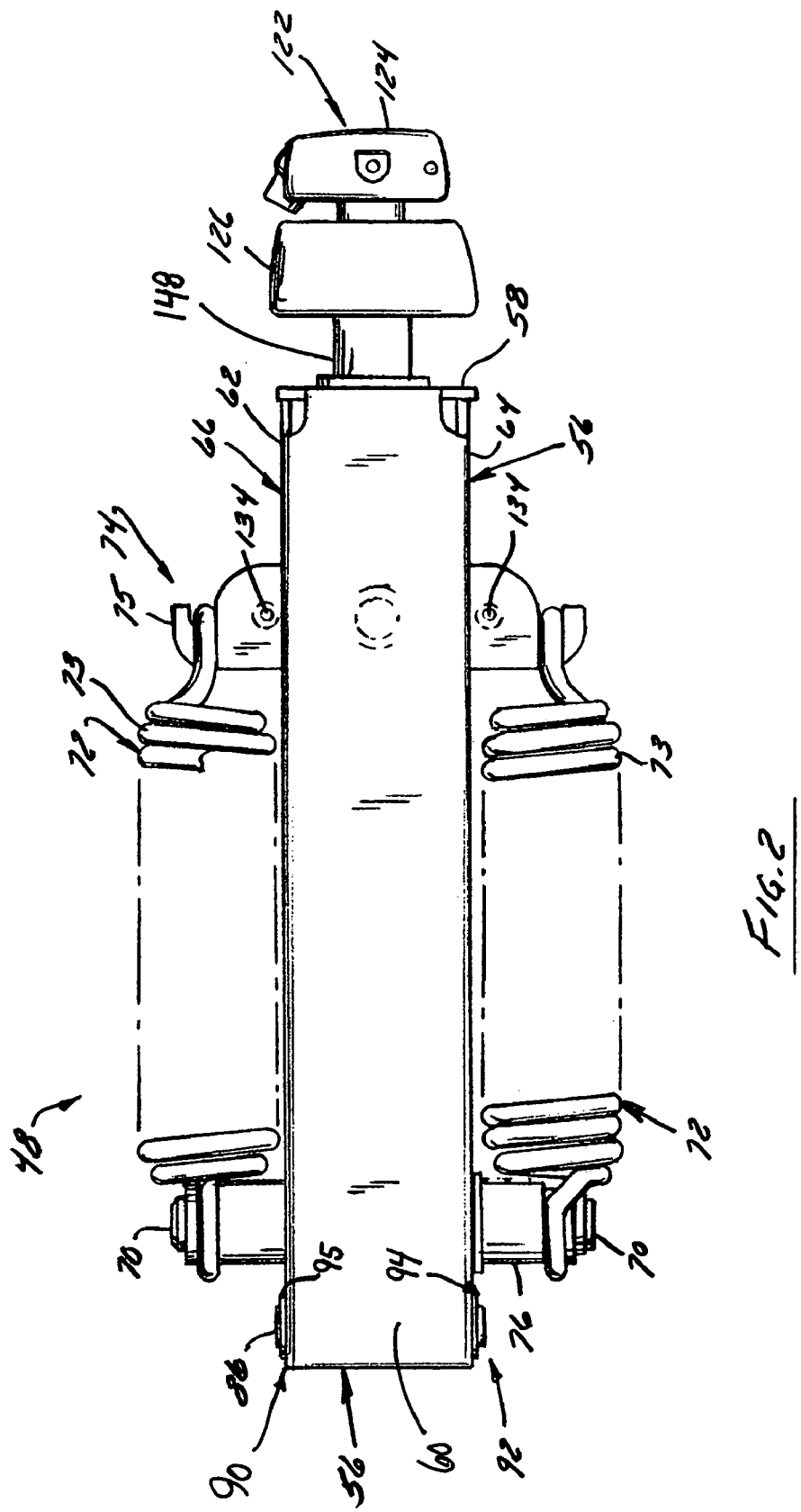

FIG. 1 illustrates a preferred embodiment of a seat suspension 40 of the invention that has a seat platform 42 and a base or ground 44 between which is disposed a linkage arrangement 46 and a suspension cartridge 48. The suspension cartridge 48 is of self-contained and modular construction to facilitate assembly and installation. The suspension cartridge 48 preferably is equipped with at least one outwardly extending arm 50 that carries a roller 52. The suspension cartridge 48 absorbs energy while providing at least weight adjustment capability. In the preferred embodiment shown in FIG. 1, the suspension cartridge 48 provides both height and weight adjustment capabilities. In the preferred embodiment shown in FIG. 1, the roller 52 cooperates with a contoured cam 54 during suspension operation.

In the preferred seat suspension embodiment shown in FIG. 1, the linkage arrangement 46 preferably comprises a scissors linkage arrangement, but is not intended to be limited to a scissors linkage arrangement. For example, the linkage arrangement 46 can be a four-bar linkage arrangement, a scissors linkage arrangement, or another type of linkage arrangement, if desired.

The linkage arrangement 46 includes a pair of spaced apart inner arms 43 each of which is pivotally attached to a corresponding one of a pair of spaced apart outer arms 45. At or adjacent one end of each arm is an axle 47 that rotatively receives a roller 49. In a currently preferred embodiment, the platform axle (not shown) is generally U-shaped so as to clear the suspension cartridge 48. Such a U-shaped platform axle advantageously also preferably can simultaneously function as a torsion bar. Each roller 49 rides in a track 51. For example, in the preferred embodiment shown in FIG. 1, the platform 42 and base 44 have side walls 53 each equipped with an inturned lip 55 that each defines a roller-receiving track 51. At or adjacent the other end of each arm 43 and 45 is an anchor rod 57 that extends therebetween to pivotally anchor the linkage arrangement 46.

Figure 3:
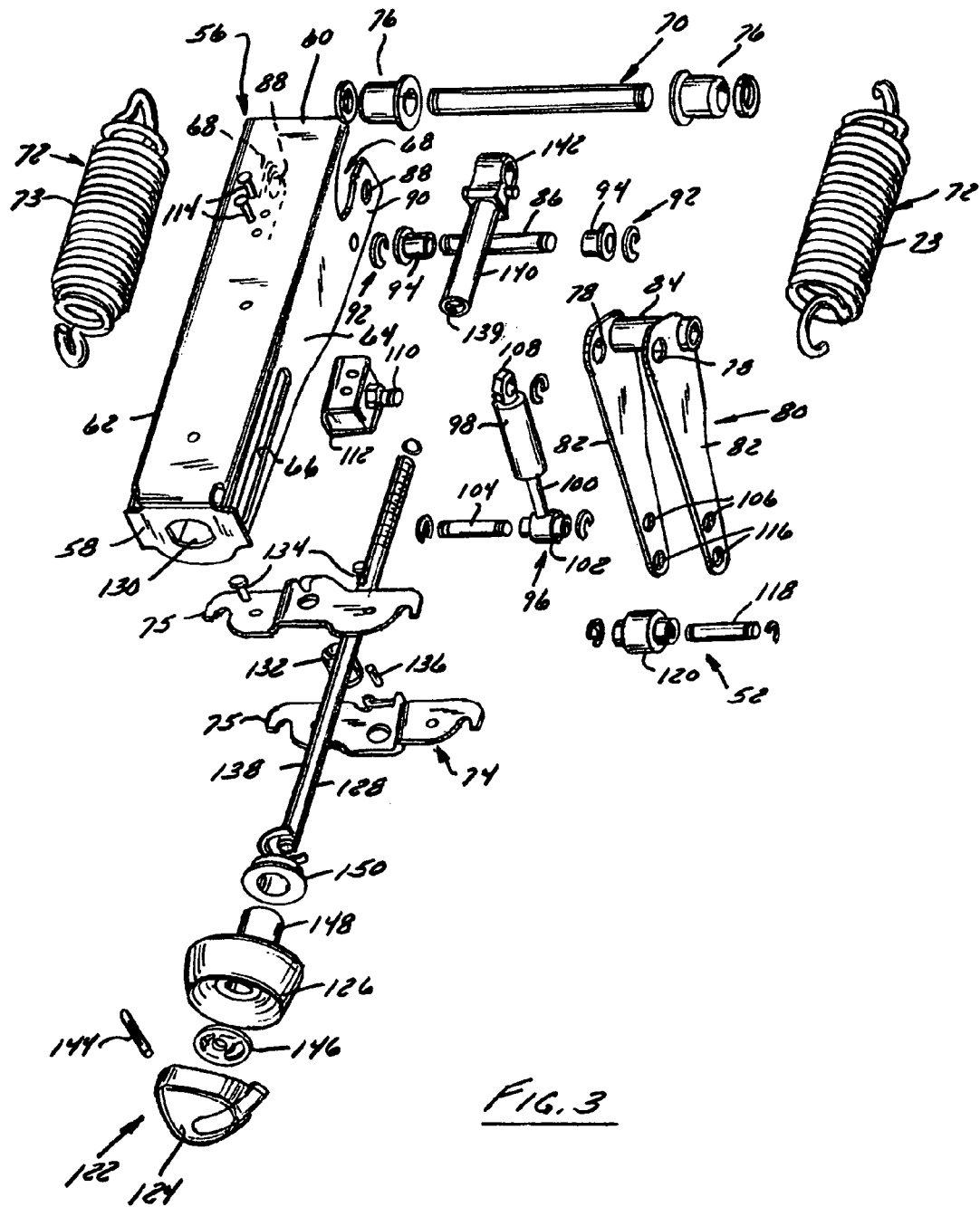
FIG. 3 is an exploded perspective view of the suspension cartridge depicted in FIG. 2.

FIGS. 2 and 3 depict a preferred embodiment of the suspension cartridge 48 of the invention. The cartridge 48 includes a cartridge housing 56 that can be of substantially tubular construction for providing strength and imparting structural rigidity to the cartridge. The housing 56 has a front wall 58, a fore-aft extending end wall 60, and a pair of sidewalls 62 and 64 that each can be equipped with a fore-aft extending ear 90. In the preferred embodiment shown in FIGS. 2 and 3, both cartridge housing sidewalls 62 and 64 are identical to each other as they are both equipped with a biasing element hanger receiving slot 66 and a clearance notch 68 in which a biasing element retainer shaft 70 is disposed.

The suspension cartridge 48 includes at least one biasing element 72 that opposes suspension collapse and absorbs energy during suspension operation. In the preferred embodiment shown in FIGS. 2 and 3, the cartridge 48 has a plurality of biasing elements 72. Preferably, each biasing element 72 is a coil spring 73 that is releasably captured in tension. If desired, the suspension cartridge 48 can be configured so as to capture each biasing element in a state of compression.

Each biasing element 72 has one end operably coupled to part of the biasing element retainer shaft 70 and has its other end operably coupled to part of a biasing element hanger assembly 74. The biasing element retainer shaft 70 preferably comprises a generally cylindrical shaft that has a generally circular cross-section. To facilitate relative movement between each biasing element 72 and shaft 70, there is a bearing 76 disposed therebetween. Referring particularly to FIG. 3, the biasing element hanger assembly 74 is made of a plurality of components that includes at least one biasing element carrying yoke 75.

The biasing element retainer shaft 70 extends through a pair of bores 78 in a suspension arm linkage arrangement 80 that preferably comprises a bell crank arm linkage arrangement. Referring more specifically to FIG. 3, the bell crank arm linkage arrangement 80 includes a pair of generally parallel and generally triangular bell crank arms 82 that are spaced apart by a hollow bearing tube 84. The bearing tube 84 preferably is fixed to each bell crank arm 82, such as by a weld or the like. To pivotally anchor the bell crank arm linkage arrangement 80 to the cartridge housing 56, a pivot shaft 86 received through the tube 84 extends through a bore 88 in each cage sidewall ear 90. To prevent the shaft from disengaging, an anchor arrangement 92 is attached to each end of the shaft 86. To facilitate relative rotation between the shaft 86 and the cartridge housing 56 as well as the bell crank arm linkage arrangement 80, each shaft end preferably is equipped with a bearing 94 that can be of tubular or cylindrical construction. In the preferred embodiment shown in FIG. 3, each shaft anchor 92 comprises a clip that can be an E-shaped clip or the like. Where the bell crank pivot shaft 86 is also equipped with bearings 94, each bearing 94 is made of a suitable low friction material.

To help dissipate energy, including vibrational energy, the suspension cartridge 48 preferably includes a damper 96 that can be a shock absorber or the like. Preferably, the damper 96 comprises a piston and cylinder arrangement whereby the piston is reciprocably received by the cylinder. If desired, other types of dampers can be used.

In the preferred embodiment shown in more detail in FIG. 3, the damper 96 has a cylindrical housing 98 from which a piston 100 reciprocably extends. The piston 100 has a mount 102 at its free end that receives a damper mounting shaft 104 that extends through a bore 106 in at least one of the bell crank arms 82. Preferably, the shaft extends through the bore 106 in both arms 82 with the damper 96 disposed between the arms 82. The damper housing 98 has a mount 108 at its free end which receives a pivot 110 that cantilevers outwardly from a bracket 112 attached by rivets 114 to an interior surface of cartridge housing end wall 60. Anchors, such as C-clips, E-clips, or the like, preferably are used to keep each damper mount pivotally engaged with its respective mounting shaft and mounting pivot.

Each bell crank arm 82 has another bore 116 that receives an axle shaft 118 that extends through the roller 52, which comprises a wheel 120 in FIGS. 2 and 3. The axle shaft 118 preferably extends through the bore 116 in each bell crank arm 82 such that the roller 52 is positioned between each arm 82. To prevent the shaft 118 from moving in an axial direction, anchors, such as C-clips, E-clips, or the like, are preferably used.

The suspension cartridge arrangement 48 also includes a height and weight adjust assembly 122. The height and weight adjust assembly 122 includes a weight adjust knob 124 that is manipulable by a seat occupant when the seat occupant desires to vary an amount of preload applied to each biasing element 72. The assembly 122 preferably also includes a height adjust knob 126 that is also manipulable by a seat occupant when the seat occupant wishes to change seat height. In the preferred embodiment shown in more detail in FIG. 3, both knobs 124 and 126 are rotatable. If desired, one or both knobs can be manipulated in another manner to achieve the respective desired effect.

Both knobs 124 and 126 are substantially coaxial with an adjuster rod 128 that extends through a port 130 in the cartridge housing front wall 58 and which preferably is substantially disposed inside the cartridge housing 56 between its sidewalls 62 and 64. The adjuster rod 128 is received through a guide 132, such as a nut that preferably is a barrel nut. In a preferred embodiment, the barrel nut 132 is captured between a pair of spring hanger yokes 75 in the manner depicted in FIG. 3. A pair of rivets 134 preferably fixes one of the spring hanger yokes 75 to the other one of the spring hanger yokes 75.

If desired, the rod 128 can carry a limiter 136 that limits travel of the barrel nut 132 relative to the rod 128 during suspension operation. In the preferred embodiment shown in FIGS. 2 and 3, the limiter 136 is a pin that is disposed in the rod 128 generally perpendicular to the longitudinal axis of the rod 128. In the preferred embodiment shown in FIGS. 2 and 3, a portion of the rod 128 is threaded 138, the threaded portion 138 is threadably received through the barrel nut 132, and the rod can rotate in either direction until the limiter 136 bears against the barrel nut 132.

The end of the adjuster rod 128 is received in a pocket 139 in one end of a fore-aft extending adjuster brace 140 that is coupled at its other end by a mount 142 to the biasing element retainer shaft 70. In one preferred embodiment, the mount 142 comprises a head with a notched opening therein that is constructed and arranged to clip onto the shaft 70. In another preferred embodiment, the mount 142 can comprise a head that has a bore that extends transversely therethrough in which the shaft 70 is received. The brace 140 preferably is disposed inside the cartridge housing 56 such that it extends in a fore-aft direction between sidewalls 62 and 64 and lies adjacent end wall 60.

In the preferred embodiment shown in FIGS. 2 and 3, a pin 144 fixes the weight adjust knob 124 to the adjuster rod 128 such that the knob 124 and rod 128 rotate in unison when the knob 124 is turned. A bearing disk 146 is disposed between the weight adjust knob 124 and the height adjust knob 126 to facilitate relative rotation therebetween. The height adjust knob 126 has a threaded stem 148 that extends outwardly therefrom which is threadably received in a threaded plug 150 that is seated either in the cartridge housing port 130 or a in slot (not shown) in the seat platform 42.

Rotation of the weight adjust knob 124 rotates the adjuster rod 128 in a corresponding direction. Rotation of the adjuster rod 128 causes the distance between the barrel nut 132 and biasing element retainer shaft 70 to change, which in turn changes biasing element tension. Changing biasing element tension increases or decreases biasing element preload, this in turn affects how the suspension accommodates a seat occupant of a particular weight as well as the nature of suspension energy absorption. Rotation of the height adjust knob 126 moves the adjuster rod 128, barrel nut 132, spring hanger assembly 74, and biasing element retainer shaft 70 in unison, causing a rotation of the bell crank 80 about pivot 84, which changes the distance between the seat platform 42 and the base 44. Changing the distance between the platform 42 and the base 44 changes the height of a seat mounted on the platform 42 relative to the base 44.

Weight adjustment effected by turning the weight adjust knob preferably does not affect seat height such that weight adjustment is substantially independent of height adjustment. Conversely, height adjustment effected by turning the height adjust knob preferably does not change the resistance of the suspension cartridge to a load applied thereto such that height adjustment is substantially independent of weight adjustment and vice versa.

Figure 4:
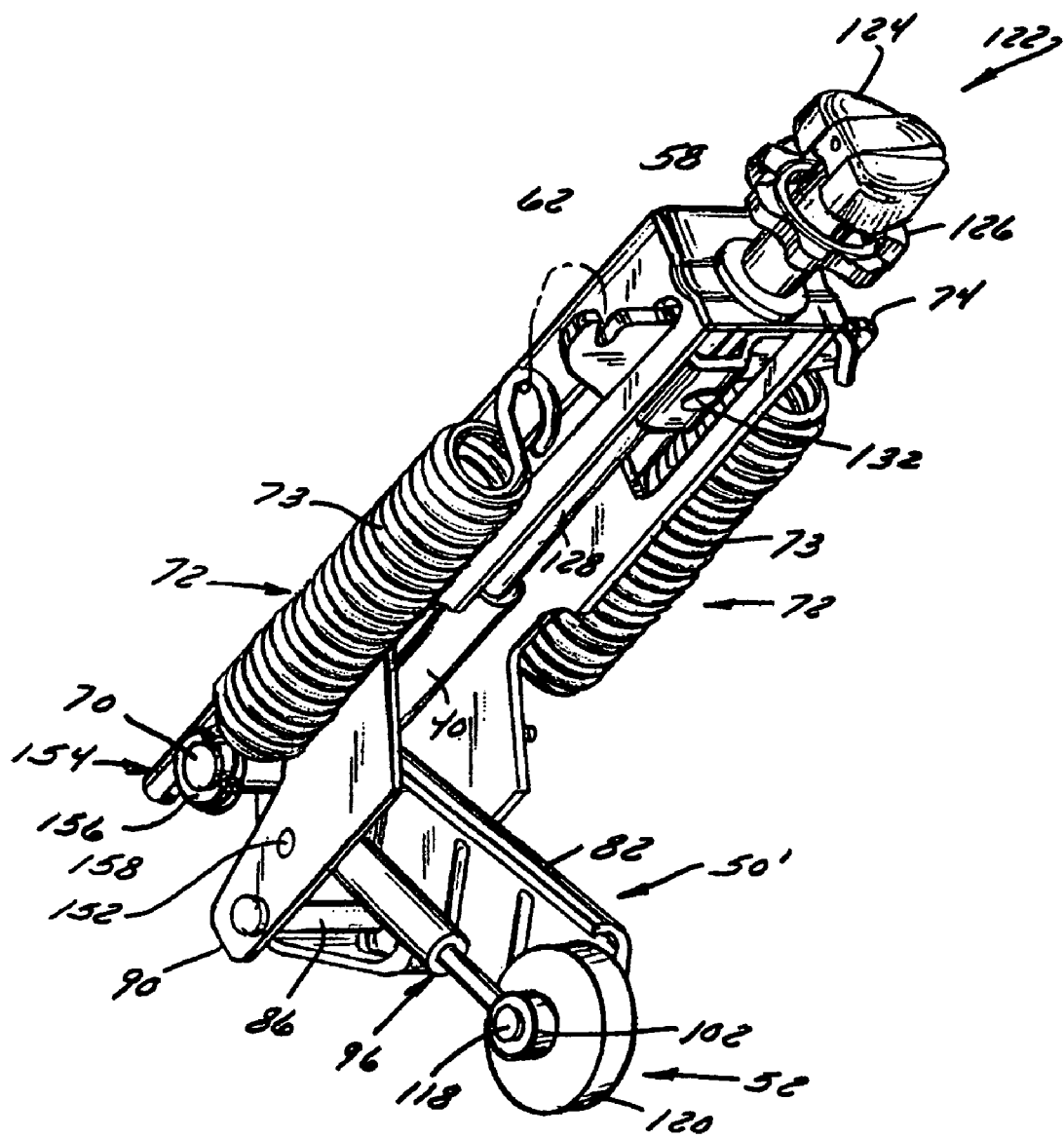
FIG. 4 is a front perspective view of a second preferred suspension cartridge! embodiment.

In the preferred embodiment shown in FIG. 4, the suspension cartridge arrangement 48 has a single suspension arm 50' that can be made of a plurality of bell crank arm plates 82, which preferably are fixed together. If desired, the arm 50' can be made of a single plate. The arm 50' also carries a damper 96, which has one end attached to axle shaft 118 and its other end attached to a pivot pin 152 that preferably cantilevers outwardly from an interior surface of one of the cartridge housing sidewalls 62. As is shown in FIG. 4, the roller 52 is a wheel 120 that is rotatively carried by axle shaft 118 between damper mount 102 and bell crank arm 50'.

Figure 5:
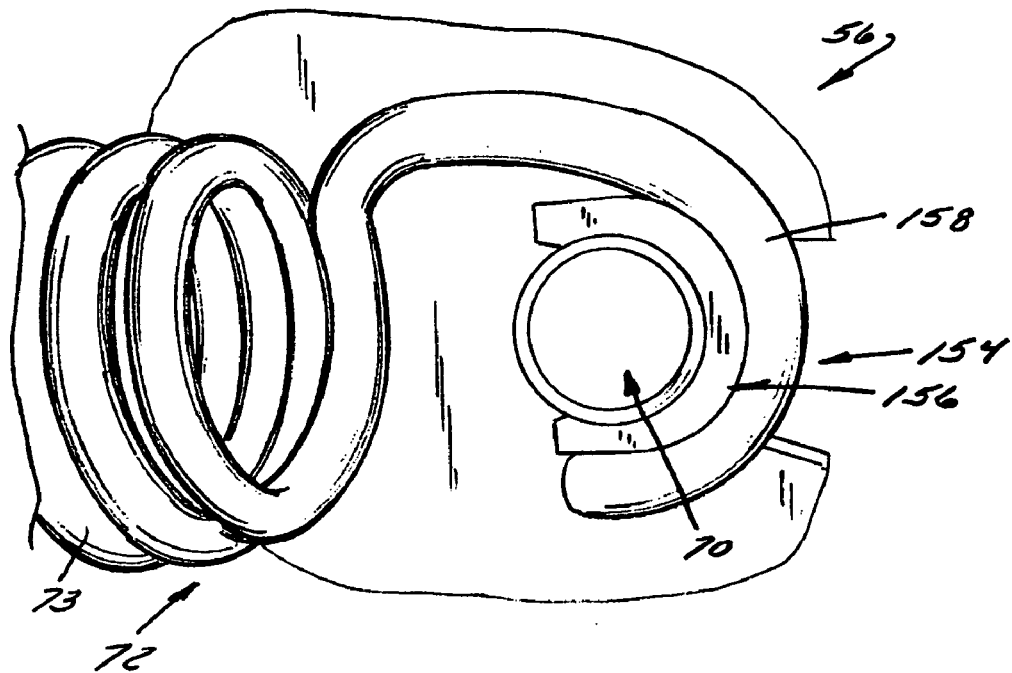
FIG. 5 is an enlarged side view of a biasing element engaged with a biasing element bearing clip.
Figure 6:
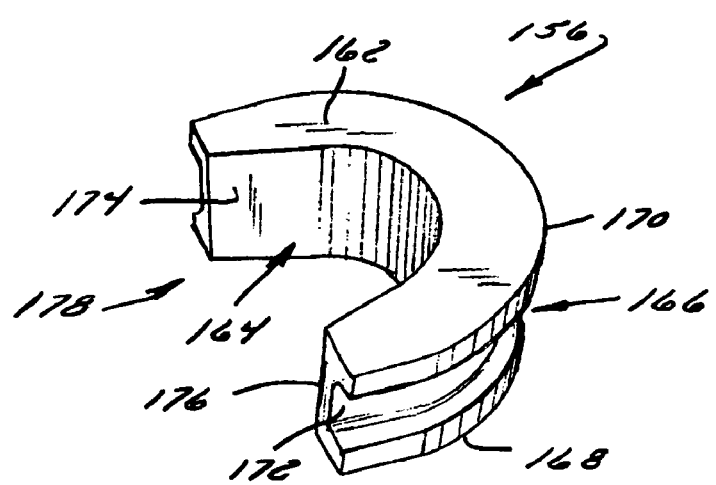
FIG. 6 is a perspective view of the biasing element bearing clip shown in FIG. 5.

Referring additionally to FIG. 5, each biasing element 72 has one end 154 that extends around a bearing clip 156 that is disposed between it and the biasing element retainer shaft 70. Each bearing clip 156 helps communicate and more uniformly distribute biasing element forces during suspension operation such that friction between the corresponding biasing element 72 and the retainer shaft 70 is reduced. Referring additionally to FIGS. 5 and 6, each clip 156 is generally C-shaped such that it encompasses an angular extent around the retainer shaft 70 of at least 180° and preferably at least about 190°. In the preferred embodiment shown in FIG. 5, the biasing element mount 154 is a hook 158 and the retainer shaft 70 is a solid shaft of circular cross section that has a circumferentially extending groove 160 (FIG. 9) in its outer periphery where the bearing clip 156 seats.

FIG. 6 illustrates the bearing clip 156 in more detail. The clip 156 has a body 162 that has a flat but arcuate inner surface 164 and a concave and arcuate outer surface 166. The outer surface 166 has a ridge 168 and 170 along each side that defines a circumferentially extending hook receiving channel 172 therebetween. To facilitate assembly onto retainer shaft 70, the inner bearing clip surface 164 has a pair of outwardly opening flats 174 and 176 that collectively define a shaft-receiving mouth 178. In assembly, there is at least a slight interference fit between the bearing clip 156 and the shaft 70 such that the clip 156 preferably snaps onto the shaft 70. Therefore, the clip 156 preferably is self-retaining on the shaft 70 upon assembly permitting the shaft 70 and both bearing clips 156 to be assembled and shipped as a unit, if desired.

Each bearing clip preferably is made of a durable and resilient material that is long-lasting and tough. One such preferred material is plastic, namely nylon. Such a material preferably flexes at least slightly to enable a snap fit to be provided between the clip 156 and the shaft 70.

Figure 7:
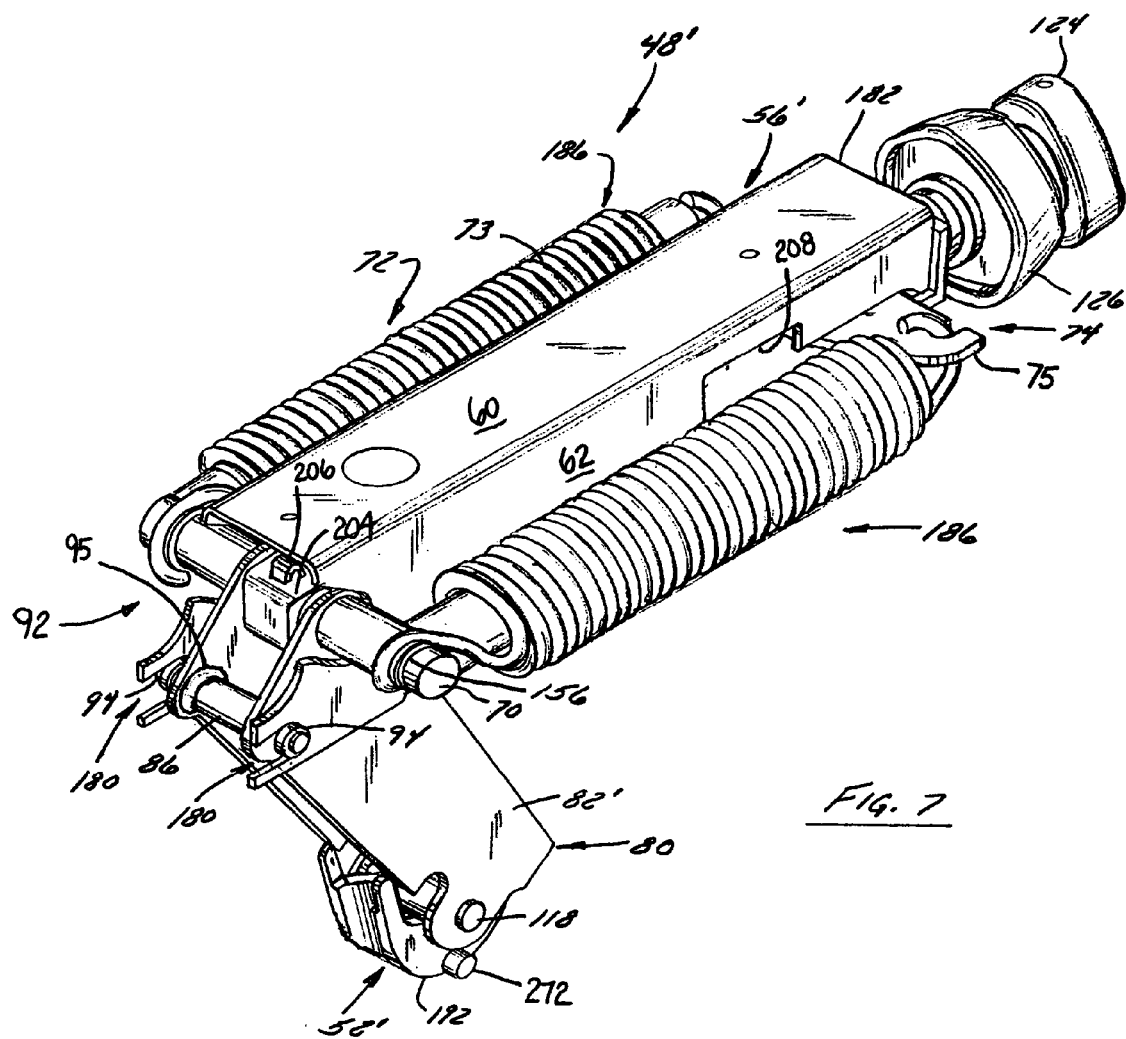
FIG. 7 is a rear perspective view of a third preferred suspension cartridge embodiment.
Figure 8:
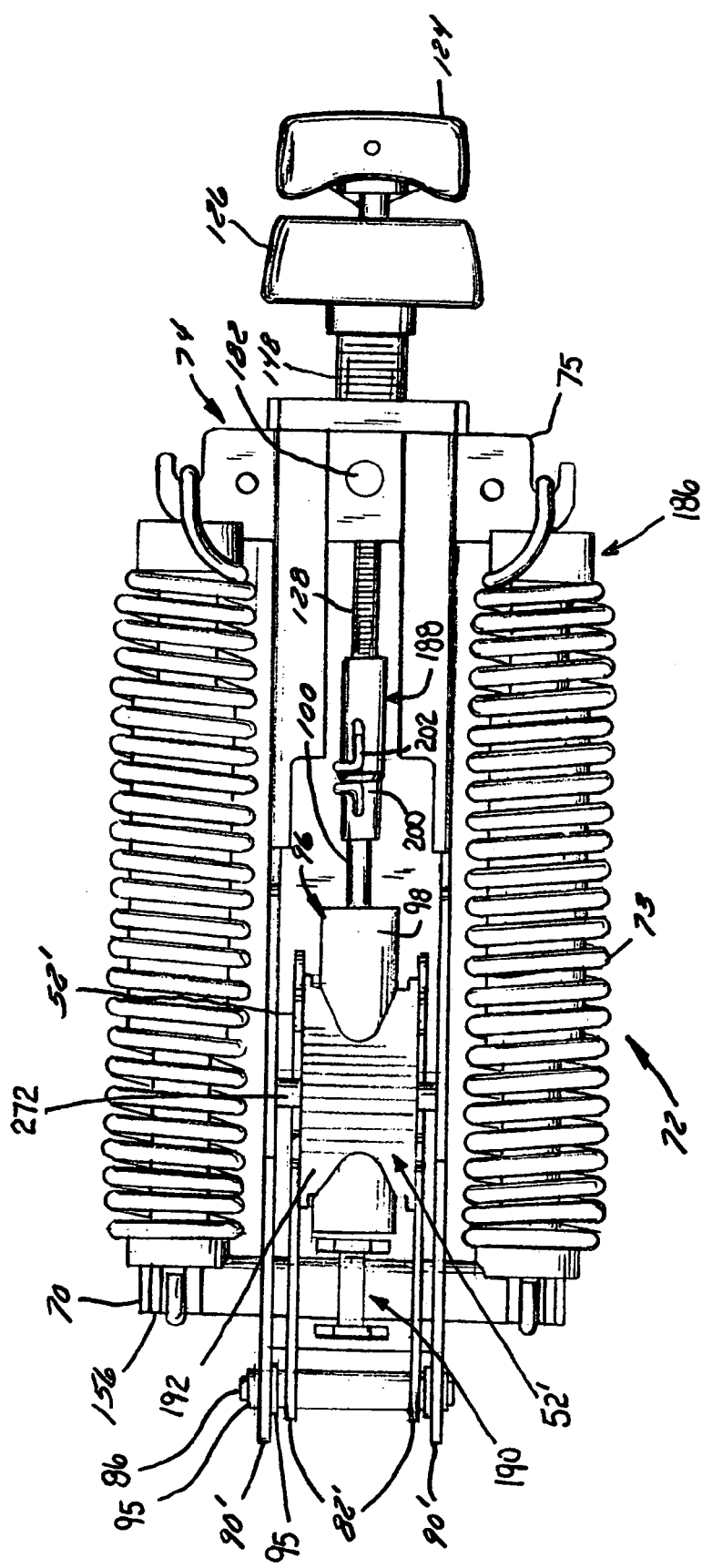
FIG. 8 is bottom view of the third preferred suspension cartridge embodiment.
Figure 9:
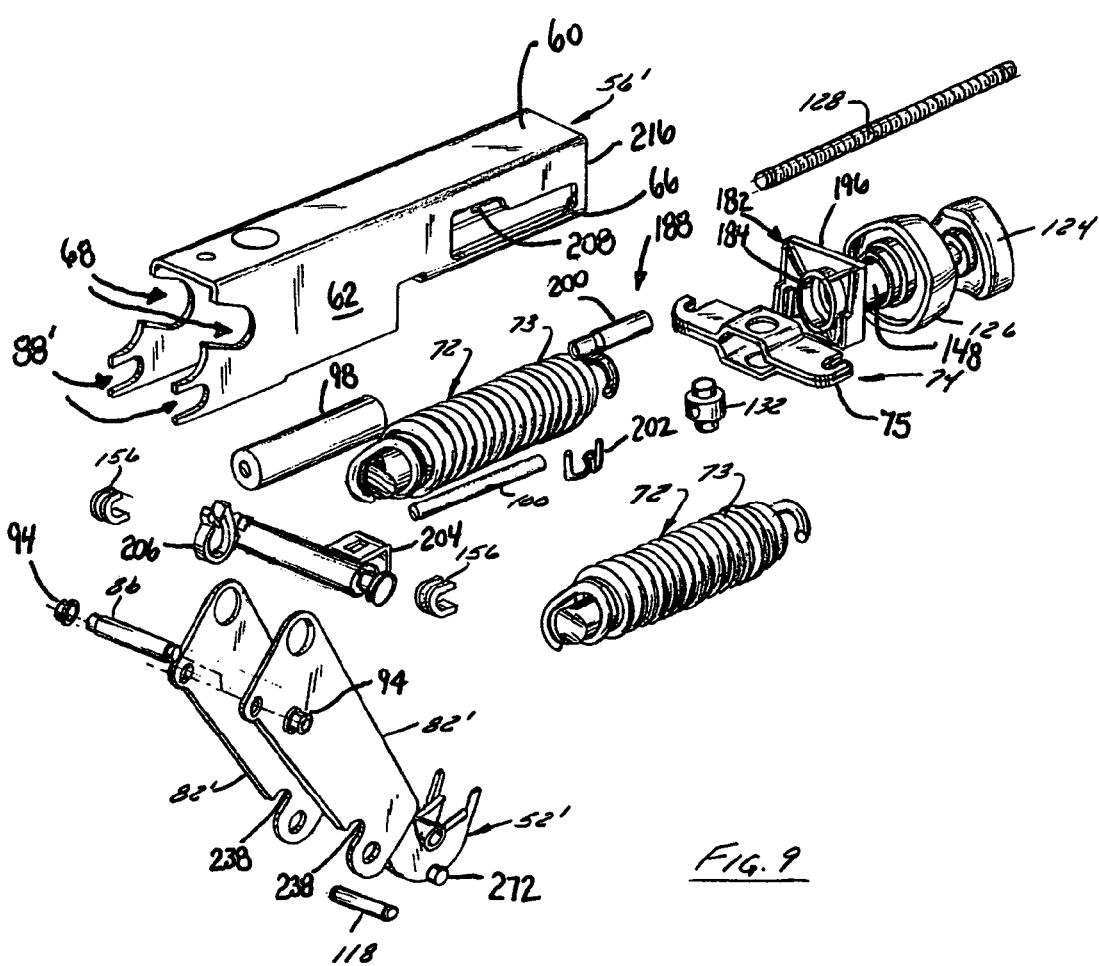
FIG. 9 is an exploded perspective view of the third preferred suspension cartridge embodiment.

FIGS. 7–9 illustrate another preferred embodiment of a suspension cartridge arrangement 48' of the invention. The suspension cartridge 48' has a housing 56' that is of substantially tubular construction and which has shaft receiving notches 68 and 180 and at one end and an end cap 182 at the other end that has a threaded bore 184 therein (FIG. 9) that threadably receives the threaded stem 148 of the weight adjust knob 124.

Referring more particularly to FIG. 8, the adjuster rod 128 is attached by a shaft coupling assembly 188 to a reciprocable piston 100 of the damper, which is disposed within the cartridge housing 56'. The shaft coupling assembly 188 includes a coupling tube or sleeve 200 that has a plurality of spaced apart bores that each receives one end of a coupling wire 202. One coupling wire end extends through one of the bores in the coupling tube 200 and into a complementary bore in the adjuster rod 128. The other coupling wire end extends through the other one of the bores in the coupling tube 200 and into a complementary bore in the damper piston 100. Opposite and in between the coupling wire ends is a curved loop of wire that is also circumferentially contoured so as to bear against an engaged the coupling tube 200 and a manner that helps retain the coupling wire ends in their respective bores.

The damper housing 98 is attached at its free end by at least one coupling bracket and clip assembly 190 to the biasing element retainer shaft 70. The end of the damper housing 98 is attached by a clip 206 to a generally U-shaped coupling bracket 204 that is fixed, such as by welding, to part of the biasing element retainer shaft 70. The coupling bracket 204 has a pair of spaced apart arms, one of which has an aperture therethrough. The clip 206 goes over shaft 70 before the damper 96 is attached to the clip 206 by snap fitting the clip into bracket arm aperture 207.

The roller 52' comprises a truncated roller 192 that can ride back-and-forth during suspension operation. In a currently preferred embodiment, the truncated roller 192 rides along a cam 54 that is upraised from the base 44.

Referring more particularly to FIG. 9, the end cap 182 is a generally square or rectangular piece of material that seats in one end 194 of the cartridge housing 56'. The end cap 182 has a cartridge housing seating groove 196 about its periphery that receives the exterior edge 198 of the cartridge housing 56'. The threaded bore 184 preferably is generally centrally located relative to the outer edges of the end cap 182. In the preferred embodiment shown in FIG. 9, the end cap 182 is made of a metallic material, such as sintered powder metal.

Figure 10:
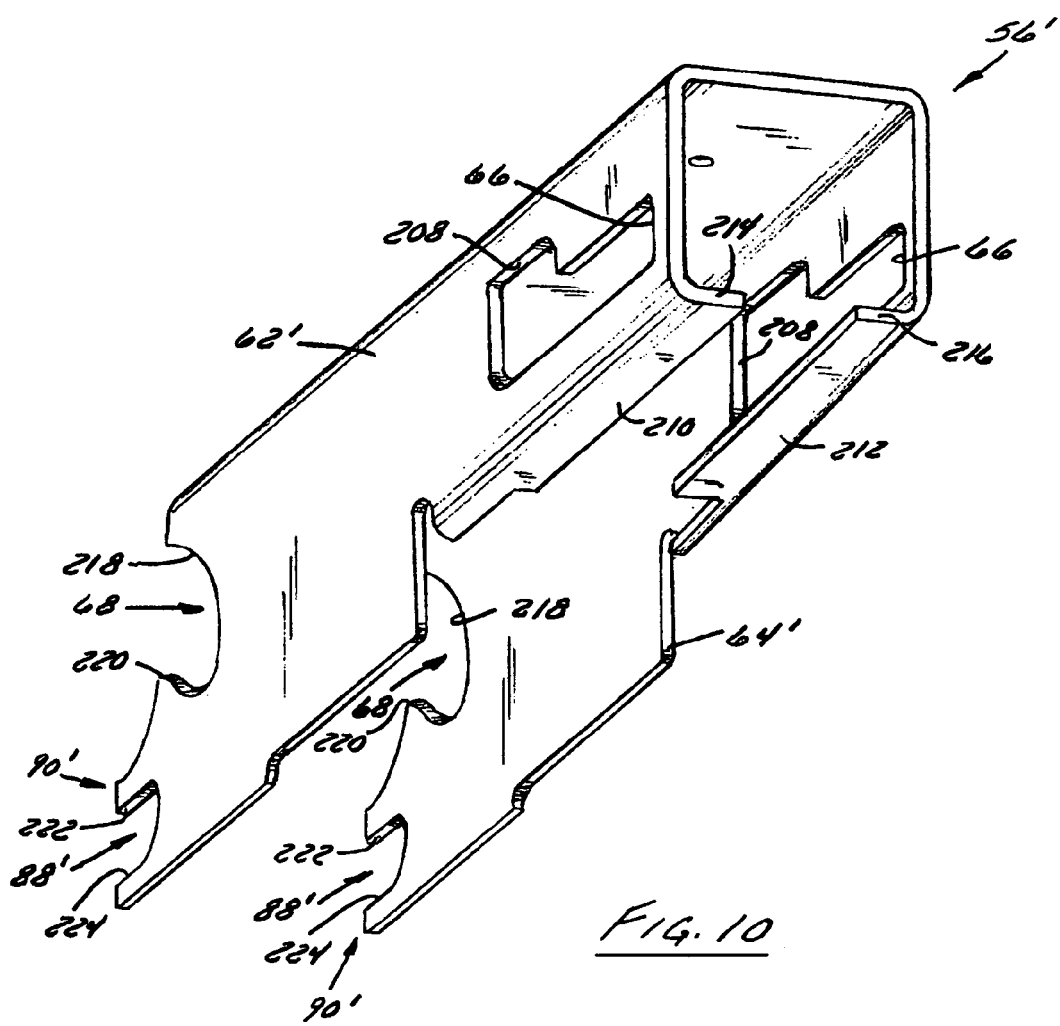
FIG. 10 is a front perspective view of a preferred suspension cartridge housing.

Referring additionally to FIG. 10, the cartridge housing 56' includes a pair of spaced apart and substantially identical sidewalls 62' and 64'. To permit sideways insertion of the hanger assembly 74, at least one hanger receiving slot 66 includes a barrel nut clearance notch 208 to facilitate assembly of the hanger assembly 74 to the cartridge housing 56'. Such an arrangement permits the hanger assembly 74 to be assembled as a unit to the cartridge housing 56'. For example, the hanger assembly 74 is slid sideways into one of the slots with the barrel nut 132 sliding through clearance notch 208.

To help improve strength and increase structural rigidity, each sidewall 62' and 64' terminates in an inturned flange 210 and 212. As is shown in FIG. 10, each flange 210 and 212 underlies part of the hanger assembly 74. In the preferred embodiment shown in FIG. 10, each flange 210 and 212 has a forward edge 214 and 216 that preferably each engages or bears against the end cap 182. In the preferred embodiment shown in FIG. 10, the forward edge of each flange 210 and 212 is received in part of the end cap seating groove 196. While each inturned flange 210 and 212 can extend substantially the entire length of its corresponding sidewall, each flange 210 and 212 preferably terminates at or adjacent its corresponding sidewall ear 90'.

Each sidewall ear 90' includes a biasing element retainer shaft receiving notch 68 that is defined by at least one curved shaft guide edge 218 that can help guide movement of the biasing element retainer shaft 70 during suspension operation. In the preferred embodiment shown in FIG. 10, however, each guide edge 218 preferably provides clearance so as not to interfere with movement of the biasing element retainer shaft 70. To prevent withdrawal of the biasing element retainer shaft 70 from the notch 68, the lower portion of the notch 68 is defined by a retainer lip 220. In the preferred embodiment shown in FIG. 10, each retainer lip 220 is shaped like a tooth.

Each sidewall ear 90' also includes a pivot shaft receiving notch 88' in which the pivot shaft 86 is disposed. In the preferred embodiment shown in FIG. 10, each notch 88' preferably is generally U-shaped such that has a pair of notch side edges 222 and 224 that both extend in a generally fore-aft direction.

These notches 68 and 88' help facilitate assembly because they permit suspension components of the suspension cartridge to be assembled from the rear of the cartridge housing 56' without the need for clips or fasteners for retaining the suspension components. For example, in the preferred embodiment shown in FIG. 10, notches 68 and 88' respectively receive and help retain biasing element retainer shaft 70 and suspension arm linkage pivot shaft 86 during assembly and during suspension operation. Where the suspension arm linkage arrangement comprises a bell crank suspension arm linkage arrangement 80, notches 68 and 88' respectively receive and help retain the biasing element retainer shaft 70 and the suspension arm linkage pivot shaft 86 during assembly and during suspension operation. During suspension operation, biasing element tension helps keep the retainer shaft 70 and the pivot shaft 86 seated in their respective notches.

Figure 11:
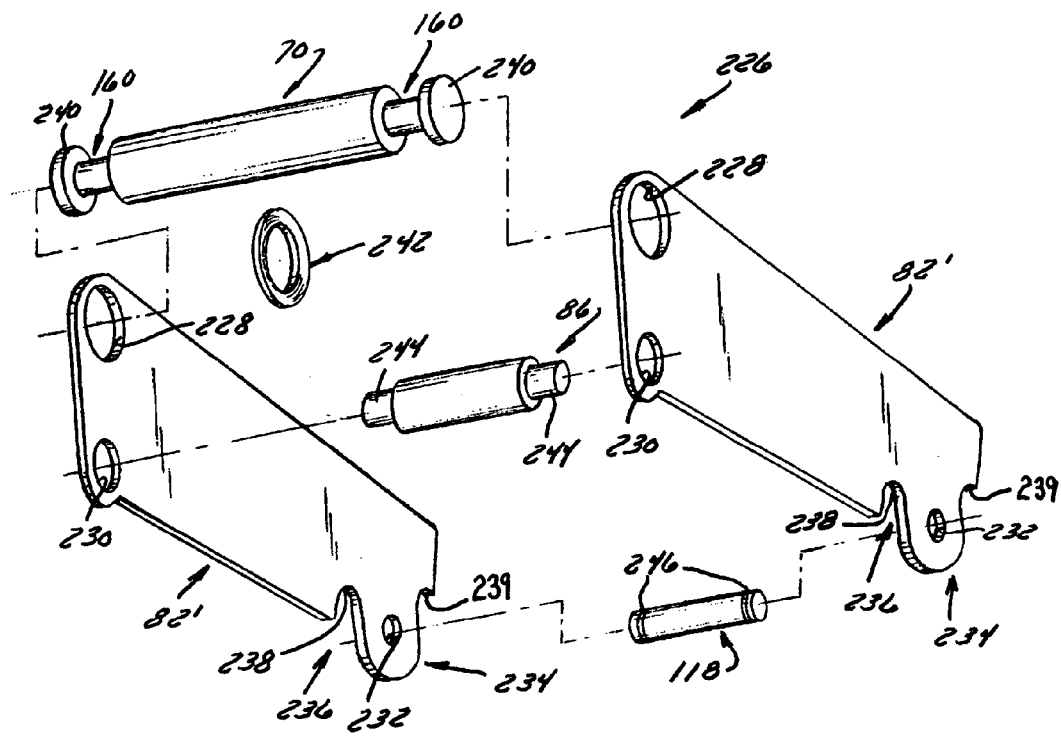
FIG. 11 is an exploded perspective view of a preferred suspension linkage arm arrangement.

FIG. 11 illustrates in more detail a preferred embodiment of the suspension arm linkage arrangement 80 that preferably is a bell crank arm linkage arrangement 226. The suspension arm linkage arrangement 226 includes a pair of arms 82', each of which is a plate preferably formed of metal. An example of a preferred method of making each arm 82' is by stamping or punching.

Each arm 82' has a plurality of bores formed therein, preferably formed at the same time that the rest of the arm 82' is formed. One of the bores 228 is a round hole formed in each arm 82' that is constructed and arranged to receive and retain the biasing element retainer shaft 70. Another one of the bores 230 is a round hole formed in each arm that is constructed and arranged to receive and retain the pivot shaft 86. A still further one of the bores 232 is a round hole formed in each arm that is constructed and arranged to receive and retain the axle shaft 118. In the preferred embodiment shown in FIG. 11, bore 232 is carried by a tab 234 that extends outwardly from the arm 82'. Part of the tab 234 is defined by a stop notch 236 that has an abutment surface 238 against which part of roller 52 bears during suspension operation to prevent roller over travel or over rotation. Another part of the tab 235 defines an abutment 239 in the opposite direction.

The biasing element retainer shaft 70 is equipped with a pair of spaced apart bearing seats 160 that each preferably comprises a groove or channel 160 formed in the shaft 70 adjacent one end of the shaft. As a result of each shaft end having such a groove or channel 160, each axial shaft end comprises a retainer head 240 that prevents a biasing element bearing 156 seated in the groove or channel 160 from moving axially relative to the shaft 70. To prevent the biasing element retainer shaft 70 from sliding axially relative to either arm 82', the shaft can be anchored by a ring 242 that can be a weld or another adhesively applied ring. In one preferred embodiment, the ring 242 is a weld that fixes the biasing element retainer shaft 70 to at least one of the bell crank arms 82'. In another preferred embodiment, the ring 242 is fixed to the retainer shaft 70 but not to any bell crank arm 82'. Such an arrangement limits axial movement of the retainer shaft 70 relative to one or both bell crank arms 82'.

The bell crank arms 82' are fixed to the pivot shaft 86. Each end of the pivot shaft 86 has a diametrically necked down portion 244 that each receives a bearing 94 (FIG. 7) that is, in turn, received in a notch 88' (FIGS. 9 and 10) in sidewall ear 90'. Each bearing 94 permits the pivot shaft 86 to rotate relative to the cartridge housing 56' during suspension operation.

The axle shaft 118 is attached to each bell crank arm 82', preferably with retaining clips or the like. For example, the axle shaft 118 that is shown in FIG. 11 has a groove 246 at each end that receives a clip or ring. For example, in one preferred embodiment, a C-clip or E-clip is used. Where retainer ring or clip is used (not shown in FIG. 11), each such ring or clip is disposed outwardly of a corresponding adjacent bell crank arm 82'.

Figure 12:
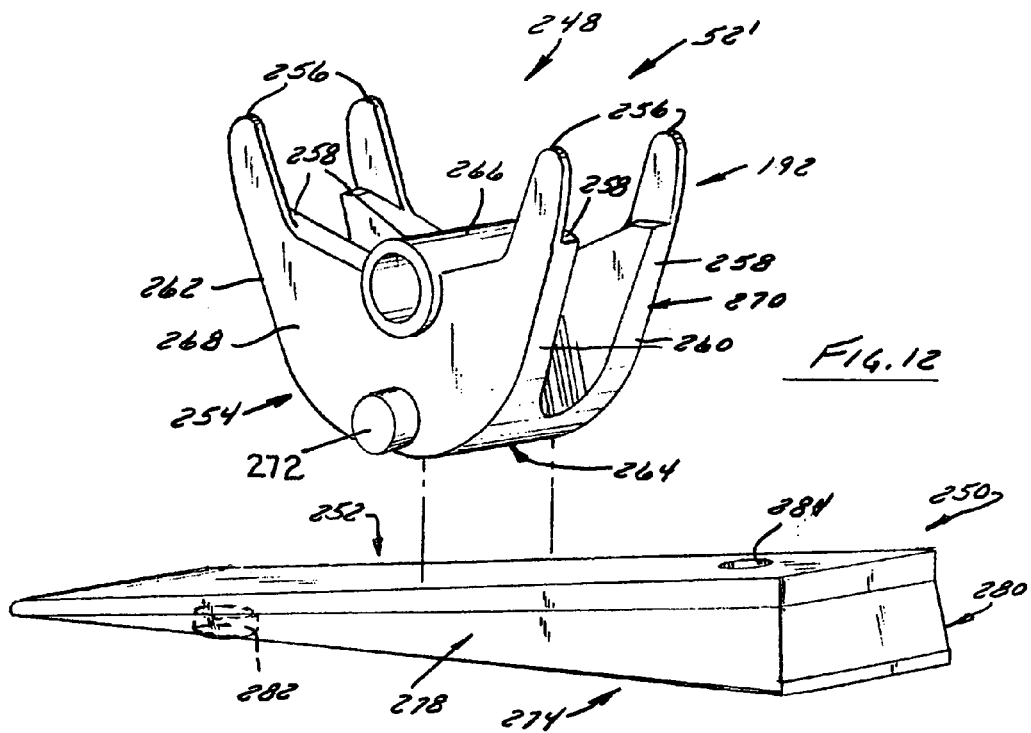
FIG. 12 is an exploded perspective view of a truncated roller follower and cam arrangement of the invention.

FIG. 12 illustrates a truncated roller cam and follower arrangement 248 of the invention. The cam and follower arrangement 248 includes a follower roller 52' that preferably is a truncated roller 192 that can roll back and forth in response to the suspension collapsing and expanding during suspension operation. The cam and follower arrangement 248 also includes a cam 54 that preferably is a ramp 250 that has a cam surface 252 that can be contoured in a manner that affects the load-deflection curve of the suspension. Although the preferred suspension embodiment depicted in FIGS. 7–12 employs a truncated roller 192, the suspension arrangement of the invention can also be used with a roller 52 that is a circular wheel that rides along the cam.

The truncated roller 192 has a body 254 with a plurality of tangs 256 that each extend outwardly from the body to help prevent truncated roller over rotation. Each tang 256 preferably extends outwardly from an arm 258 that, in turn, extends outwardly from the truncated roller body 254. Preferably, there are two pairs of such arms 258 with one pair of arms 258 extending outwardly in one direction and the other pair of arms 258 extending outwardly in another direction. Each pair of arms carry a flat 260 and 262 that is capable of sliding relative to the cam when the flat is in contact with the cam. The region between the flats 260 and 262 defines an outer profile 264 that preferably is arcuately contoured so as to, for example, produce a semi-circular contour. This arcuately contoured outer profile 264 is in rolling contact with the cam 54 during suspension operation.

The truncated roller 192 has a spindle or hub 266 that receives axle shaft 118. The hub 266 preferably is generally cylindrical and comprise a bearing, if desired. The hub 266 preferably is integrally formed as part of the truncated roller body 254.

The truncated roller body 254 has a pair of sidewalls 268 and 270 that each includes an outwardly extending over rotation preventing boss 272, only one of which is shown in FIG. 12. As the truncated roller 192 rotates during suspension operation, the roller behaves as a conventional roller unless and until, through for example some rare unloaded event, the roller 192 gets out of sync with the cam 54. If an out of sync condition occurs, one of the flats comes into contact with the cam 54 and re-indexes the truncated roller 192 relative to the cam such that part of the arcuately contoured outer profile goes back into contact with the cam 54. During re-indexing, sliding contact can occur between one of the flats and the cam 54.

Each boss 272 also helps prevent the roller 192 from getting out of sync with the cam 54. One or both bosses 272 engages a corresponding abutment surface only as a redundant follower rotation limit, which is not intended to occur during normal suspension operation. For example, during assembly, each boss 272 can engage an abutment surface to prevent improper orientation of the truncated roller 192 from occurring.

The truncated roller 192 has a contact surface that includes each flat 260 and 262 and the outer profile 264 between the flats. The contoured outer profile comprises a partial circumference that is at least great enough to permit the roller to pivot about the axle shaft 118 throughout the entire suspension travel. In other words, the developed length of the arcuately contoured outer contact surface is at least greater than the length of that portion of the cam contact surface with which the outer contact surface comes into contact during full suspension travel.

In one preferred embodiment, this contact surface preferably encompasses an angular extent of at least 30°. In one preferred embodiment, the truncated roller contact surface encompasses an angular extent of between 30° and 270°. As a result of this configuration, the truncated roller 192 has a larger effective radius than a round roller of a similar overall height. This advantageously reduces friction, increases robustness, and improves durability, all without substantially increasing cost.

In one preferred embodiment, the truncated roller contact surface has an effective radius of at least about 15 mm and no more than about 50 mm. In a currently preferred embodiment, the truncated roller contact surface has an effective radius of about 26 mm In this same preferred embodiment, the outer profile 264 of the contact surface has a width that is at least about 26 mm. The truncated roller 192 is made of a durable, resilient, and long-lasting elastomeric material that preferably is acetal. If desired, other materials, such as plastic, metal, alloyed steel, or the like, can be used.

The cam 54 has a bottom 274, a top 252, a pair of sidewalls 276 and 278, and a rear wall 280. The top surface 252 is the cam surface upon which the roller rides during suspension operation. In the preferred embodiment shown in FIG. 12, the cam surface 252 is substantially smooth and substantially straight so as to impart a substantially linear load deflection curve to the suspension. If desired, the cam surface 252 can deviate from being straight to provide a load deflection curve that is nonlinear. For example, the cam surface can be curved so as to provide a curvilinear load deflection curve. In another example, the cam surface can have a first portion that is substantially straight and a second portion that is generally curvilinear where needed. Other variations are possible.

The cam 54 preferably is fixed to the base or the ground. In the preferred cam embodiment shown in FIG. 12, the bottom 274 of the cam has an outwardly protruding boss 282 that is received in a corresponding bore (not shown) in the suspension base. To further anchor the cam 54, the cam 54 has a bore 284 that is constructed and arranged to receive a fastener, such as a screw, a bolt, or the like, that extends through a bore (not shown) in the suspension base and into the cam bore 284. If desired, an adhesive can also be used with or without one or more fasteners in anchoring the cam to the suspension base.

The cam 54 preferably has a height at its highest end that increases maximum suspension stroke by a corresponding amount without adversely increasing the height of the suspension when it is in a substantially collapsed or fully collapsed position. In one preferred embodiment, the cam 54 has a height at its highest end that is at least 5 mm and no higher than 35 mm. In one preferred embodiment, the cam has a substantially linear contact surface that has an angle of inclination that can vary between 0° and 25°. The cam 54 preferably has a height at its lowest end that is substantially the same as the planar interior surface of the seat base 44. Preferably, the cam surface 252 substantially continuously linearly tapers from the highest end to the lowest end where the cam surface 252 meets the substantially planar interior surface of the seat base 44.

The cam 54 is made of a durable and resilient, and long-lasting material that preferably is of metallic construction. For example, in a currently preferred embodiment, the cam 54 is made or formed of metal. If desired, other materials, such as plastic, alloy steel, or the like, can be used.

In assembly, the suspension cartridge 48 is attached to either the seat platform 42 or the base 44, depending upon the desired configuration sought to be obtained. Where the suspension cartridge 48 is used in conjunction with a cam 54, the cam 54 is attached to the other one of the seat platform 42 or base 44.

To attach the suspension cartridge 48, a plurality of spaced apart rivets 114 (FIG. 3) preferably are used to fix the cartridge housing end wall 60 to the platform 42 or the base 44. While the cam 54 can be attached in a like manner, at least one fastener (not shown) preferably is used to fix the cam 54 to the other of the platform 42 or base 44.

In assembling the suspension cartridge 48, the suspension cartridge housing preferably functions as a frame or skeleton that carries or supports the rest of the components of the cartridge. In putting together the hanger assembly 74, a pair of rivets 134 are used to fix the upper hanger yoke 75 to the lower hanger yoke 75, with the barrel nut 132 captured between the yokes 75. The hanger assembly 74 is then manipulated so as to be received in the clearance notch 208 of slot 66 in the cartridge housing so as to position the barrel nut 132 inside the cartridge housing, with the biasing element retaining arms extending outwardly on each side beyond the housing 56'.

The adjuster rod 128 is assembled to the weight adjust knob 124, inserted through the height adjust knob 126, and inserted through the threaded bore 184 in the cartridge housing end cap 182. The threaded stem 148 of the height adjust knob 126 is threaded into the threaded bore 184 in the cartridge housing end cap 182. This entire assembly is maneuvered toward the cartridge housing 56' so as to position the end cap 182 against the outer axial edge of the housing 56' such that it seats in end cap groove 196 and the adjuster rod 128 is threadably received by the barrel nut 132. The adjuster rod 128 is threaded into and through the barrel nut 132 such that at least part of the rod 128 extends outwardly beyond the barrel nut 132.

The suspension arm arrangement 50 is also put together as a subassembly. The roller 52 or 52' is placed between a pair of bell crank arm plates 82' and the axle shaft 118 is inserted through the bore 232 in one of the plates, through the hub 266 of the roller, and through the bore 232 in the other one of the plates. Retainers, such as a clip or the like, can be attached to each end of the axle shaft 118 to prevent the shaft from pulling free of either plate and the hub 266.

The bell crank pivot shaft 86 is assembled to each bell crank arm plate 82'. In assembly, a bearing sleeve 94, or the like, is received in each diametrically necked down portion 244 of the shaft 118. Thereafter, each shaft end 244 and its corresponding bearing 94 are inserted into a corresponding bore 230 in each one of the bell crank arm plates 82'. Retainers, such as a clip or the like, can be attached to each end of the pivot shaft 86 to prevent the shaft from pulling free.

The biasing element retainer shaft 70 is assembled to each bell crank arm plate 82'. In assembly, the shaft 70 is inserted through a corresponding bore 228 in each one of the bell crank arm plates 82'. Thereafter, the shaft 70 is fixed to the plates 82' by welding or the like. A bearing clip 156 is snapped into each shaft groove 160.

The suspension arm subassembly is then assembled to the cartridge housing 56'. In assembly, the subassembly is manipulated so as to position the bell crank pivot shaft 86, with its bearings 94 attached, and the biasing element retainer shaft 70 respectively in notch 88' and in notch 68. In the preferred embodiment shown in FIGS. 7–12, no retainer clip preferably is needed to axially retain shaft 86 because each cartridge housing sidewall ear 90 advantageously also functions as a retainer, in conjunction with each bearing flange 95, thereby reducing the number of suspension components needed.

With the biasing element hanger assembly 74 disposed in an aft most position, each biasing element preferably is attached at one end to the biasing element hanger assembly 74 and at its other end to the biasing element retainer shaft 70. The damper is manipulated so as to position it inside the cartridge housing in between the sidewalls of the housing.

The damper is then attached at one end to the shaft 70 by a coupler 190, preferably by wrapping a coupling strap 206 around the biasing element retainer shaft 70. In one preferred embodiment, the coupler 190 is arranged to facilitate adjuster rod rotation. For example, if desired, the damper piston rod 100 can be constructed and arranged to rotate relative to the damper housing. If desired, the damper 96 can be coupled to the biasing element retainer shaft 70 in a manner that allows the damper 96 to rotate substantially in unison with the adjuster rod 128 and relative to the biasing element retainer shaft 70. In one preferred embodiment, there is a second rod (not shown) that extends outwardly from the damper housing to which clip 206 attaches. Attachment preferably can be in a manner that facilitates relative rotation therebetween. If desired, another arrangement can be implemented to accommodate adjuster rod rotation and damper coupling to the biasing element retainer shaft 70.

In one preferred method of assembly, the piston 100 of the damper 96 is maneuvered so as to move its end out of line relative to the adjuster rod 128. The coupling tube 200 of the coupling assembly 188 is telescoped over the damper piston 100 such that there is clearance between the piston 100 and/or the tube 200 and the end of the adjuster rod 128. Thereafter, the coupling tube 200 and damper piston 100 are brought in line with the adjuster rod 128. The tube 200 is then slid over the free end of the adjuster rod 128 and rotated until its aft most bore lies in registry with a corresponding bore in the damper piston 100. One end of the coupling wire 202 is manipulated so as to be received through both bores. Thereafter, the other end of the coupling wire 202 is brought into registry with the other bore in the coupling tube 200, and the weight adjust rod 128 is rotated until a bore disposed in the shaft 128 adjacent its free end receives the coupling wire end. Further rotation of the weight adjustment shaft 128 simply causes a change in biasing element preload (e.g., change in tension or compression).

Figure 13:
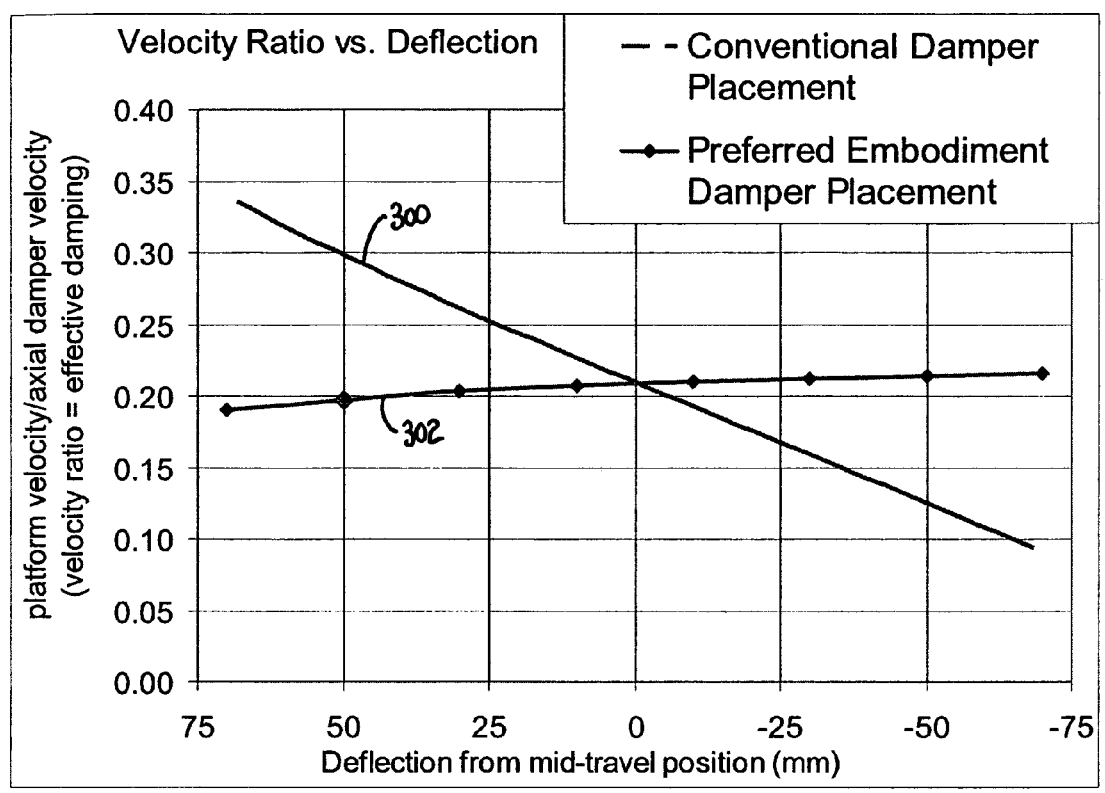
FIG. 13 is a damping effectiveness curve comparing damper velocity ratio versus deflection for a seat suspension employing a prior art damper arrangement and a damper arrangement employed in accordance with the present invention.

Referring additional to FIG. 13, since damping force during suspension operation is linearly dependent on velocity, the velocity ratio is indicative of damping effectiveness. This chart of FIG. 13 shows that in a conventional prior art damper configuration, the effectiveness 300 of that damper arrangement is dramatically different at different suspension stroke positions. Near the top of suspension travel, a typical prior art plate-to-plate damper arrangement is more effective than at mid-stroke, and near the bottom of the travel there is nearly no system damping. These inconsistent damping characteristics are undesirable. As is further shown in FIG. 13, the preferred damper arrangement depicted in FIGS. 7–9 provides for nearly constant damping behavior 302 which allows for more predictable, tunable and consistent vibration isolation throughout all suspension stroke positions. In fact, damping effectiveness increases at and near full suspension stroke as compared to the prior art, which provides virtually no system damping.

In operation, the suspension arm arrangement 50 extends outwardly such that the roller 52 bears against either the cam 54 or directly against the seat base 44. As the suspension is loaded, force from the load is transferred along the bell crank arms 82', causing the bell crank arms to pivot about the pivot shaft 86. This pivoting action creates a moment arm about the pivot shaft 86 that causes the load to be transferred to the biasing elements 72 and the damper 96. During suspension operation, the biasing elements 72 and the damper 96 work in concert to help absorb vibration, jolts, shocks, and other types of loading conditions that the suspension 40 may encounter.

To adjust the height of the seat relative to the base 44, the height adjust knob 126 is rotated. As the knob 126 is rotated, it displaces the biasing elements 72, the damper 96, the spring hanger assembly 74, and the biasing element retainer shaft 70 in unison in either a fore direction or an aft direction, depending on the direction of knob rotation. Within the limits dictated by the components, layout and arrangement of the suspension 40, height adjustment preferably is infinitely variable.

To adjust the weight resistance of the suspension 40, the weight adjust knob 124 is rotated. As the knob 124 is rotated, it causes relative movement between the biasing element hanger assembly 74 and the biasing element retainer shaft 70, which changes the biasing element preload. Depending on the direction of rotation of the knob 124, the suspension 40 can be made firmer or softer. Within the limits dictated by the components, layout and arrangement of the suspension 40, weight adjustment preferably is infinitely variable.

Recapitulation

Due to space constraints between the top and bottom plates, and connected linkage, it is desirable to be able to install an element that contains both the energy adjustment, and vertical height adjustment encompassed in one module. The invention allows for assembly of a mechanical system that incorporates discrete vertical and weight adjustment mechanisms in a single freestanding element (vertical/ weight energy cartridge). The freestanding element can be more easily assembled to the aforementioned seat suspension. This is a departure from that of a traditional suspension embodiment that would otherwise be more time and labor intensive during the assembly process.

The energy cartridge system of this invention is self-contained. All spring forces preferably are managed within the cartridge assembly. This allows the assembly of the energy cartridge to be independent of the suspension final assembly. The entire module preferably is attached to the top plate of a scissors style suspension, preferably using rivets, tabs, or screws. The invention does not require welding, which is a significant improvement over the prior art. The large roller bears on a suspension plate structure, such as the bottom plate structure shown, to drive the suspension vertically to oppose an external force applied to the suspension assembly and to suspend the operator mass.

A cylindrically shaped load bearing surface, positioned between a tension adjust knob and a front formed tab of the cartridge housing allows the springs, spring hanger, tension adjust shaft, and knob, to continuously align generally or substantially normal relative to the bell crank spring anchor center, throughout suspension travel. One end of an extension spring is attached to a spring hanger bracket that is connected to the tension adjust shaft with a threaded barrel shaped weight adjust nut. The barrel nut weight adjust nut allows the spring hanger to freely rotate or pivot about the vertical axis of the nut, thereby allowing the force applied by each extension spring to equalize. The spring hook attachment points, one at the spring hanger bracket and the opposite at the bell crank spring anchor, are positioned to align the body of the spring, and thus the force vector of the spring, with the longitudinal axis of the tension adjust shaft. When combined, the spring hanger and weight adjust nut assembly, and the co-axial position of the spring mount location in the spring hanger, provides essentially purely axial loads on the tension adjust threads. This optimizes the thread friction condition, and reduces torque required to increase or decrease the extension spring pre-load to change the weight setting of the suspension.

The bell crank portion of the system preferably is assembled without requiring any retainer clips or pins. The single bell crank arm contains three holes, with two of the holes preferably configured to provide the shape of a "keyhole" that helps retain the bell crank pivot bearing and the roller pivot pin. A third hole, that is depicted as being round, comprises a through hole for assembling the spring mount cross bar. The primary cartridge housing also contains a "keyhole" type opening to facilitate assembly and retention of the bell crank pivot pin. These "keyhole" type openings allow the pivot pins and the bell crank pivot bearing to be inserted through an oversized shape at one end of the opening. The pins and pivot bearing are then translated to a reduce size shape at the opposite end of the keyhole opening that retains the pin or bearing in their operating position. The keyhole openings are oriented in such a way that the force vector applied at the joint biases the pin or bearing into the reduced size or matched shape of the keyhole opening thus preventing the component from translating too far toward the oversized end of the key hole opening. The pins and bell crank bearing are laterally axially retained in the operating position by radial grooves, sized to fit the reduced size end of the keyhole opening. Further, the grooves in the roller pin and the bell crank bearing laterally constrain the bell crank arms and bell crank pivot pin acts to constrain a lower ear of the cartridge housing. Further, if desired, the bell crank pivot bearing is fixed from rotation with respect to the bell crank arms. If desired, the bell crank pivot pin and keyhole opening in the lower ear of the cartridge housing can be shaped to prevent rotation of the pin with respect to the cartridge housing. This configuration helps assure that rotation will occur between the bell crank pivot pin and the bell crank bearing surface. Additionally, if desired, the roller pivot pin and keyhole opening in the bell crank arm can be shaped to prevent rotation of the pin with respect to bell crank arm thus assuring that rotation will occur between the roller pivot pin and the roller.

The bell crank pivot bearing with spring mount cross bar (not shown), can comprise a singular powder metal or die cast part, and preferably can be configured so as to be self-retaining. 180 degrees of bearing surface preferably is provided for the bell crank pivot pin. This particular preferred angular extent of bearing surface is not required for the system to function, but allows a significant reduction in piece count and improves the assembly method. This preferred configuration also fixes the position of the bell crank pivot bearing with spring mount cross bar with respect to the bell crank arms assuring rotation will occur between the intended surfaces. If desired, a lesser or greater angular extent of bearing surface can be used with the bearing surface preferably ranging from between 90 degrees to 270 degrees such that sufficient bearing surface is provided that provides enough bearing surface contact to adequately function as a bearing. Thus, a cylindrical bearing (i.e., having 360 degrees of bearing surface) is not needed. In a preferred embodiment, the bell crank pivot bearing has a bearing surface with an angular extent of between 135 degrees and 235 degrees with the angular extent preferably being about 180 degrees. In another preferred embodiment, the angular extent of the bearing is between 150 degrees and 210 degrees.

A spring bearing is provided between the spring mount cross bar and the hook of the extension spring. A groove is provided in the spring mount cross bar to simultaneously constrain the spring bearing and spring hook in the lateral axis. Further, if desired, the shape of said spring bearing can be configured such that the radius center of the load bearing saddle (e.g., spring hook) for the spring wire is offset and need not be concentric with the center of the spring mount cross bar. Under extension spring load, these two centers preferably are co-linear with the axis of the extension spring. This co-linearity and offset location of the center axis of the spring hook and the spring mount cross bar creates an alignment force that resists the friction created by the relative motion of the cross shaft and the bearing. The bearing is thus held in position by its geometry and therefore does not need any secondary abutment surfaces or secondary elements for retention.

In a preferred embodiment, each spring bearing has an angular extent of less than 360 degrees and is not axially inserted like conventional inserts that have been used to receive and retain a hook end of a suspension spring. In a preferred embodiment, each spring bearing has an angular extent that can range between 120 degrees and 210 degrees. If desired, each spring bearing can be constructed so as to have an angular extent between 120 degrees and 150 degrees. In one preferred embodiment, each spring bearing has an angular extent of about 180 degrees.

The spring bearing is snapped over a portion of an arm or rod of the spring mount cross bar. Preferably, each arm of the cross bar has a recess, pocket or groove that receives one of the spring bearings. In assembly, each spring bearing is moved in a radial direction relative to the cross bar toward the cross bar until it engages the bar. Preferably, it snaps in place such that it is substantially self-retaining, at least until a spring hook of a suspension spring is received on the bearing. Each arm has an expanded end that is larger than the recess, pocket, or groove in which the spring bearing is received such that it prevents axial displacement of the bearing in a direction that would disengage the bearing from the cross bar. Likewise, the cross bar has an enlarged or expanded section inboard of each spring bearing so as to prevent axial displacement toward either one of the bell crank plates. As a result of this construction, when each spring hook is assembled over one of the spring bearings, each spring bearing is held in place without the use of any separate retainer.

In a preferred embodiment, each spring bearing is made of a synthetic material that preferably is a plastic, such as a nylon. One preferred material is Delrin. An advantage of making each bearing of such a non-metallic material is that the bearing preferably can be molded, such as, preferably injected molded, thereby keeping the cost of this component relatively low. Additionally, such a material advantageously provides a rather robust, resilient, reliable, conformable, and long-lasting bearing between each spring hook and the spring cross bar. Also, no lubricant is needed between the bearing and the hook and no lubricant is needed between the bearing and the spring cross bar. If desired, each spring bearing can be made of a powdered metal that can be impregnated with a lubricant, if needed.

A machined steel cross pin can also be used as an alternate embodiment for the spring mount cross bar. The lateral axial constraint of the machined cross pin can be provided by an enlarged plastic spring bearing that engages the slot in the spring mount cross bar and the outer surface of the cartridge housing.

There are a number of suspension energy mechanism designs that can incorporate the self-retaining aspect on the bell crank system. For example, another preferred embodiment incorporates the same bell crank arms plate and allows space between the arms to positions the damper on the bell crank. Another preferred embodiment incorporates the same fundamental bell crank geometry, and allows room to position the damper. However, if desired, the bell crank preferably can be manufactured as a single die cast part.

One aspect of the invention is that the primary energy absorbing or compensating components are self-contained in a cartridge of modular construction that can be preassembled and then shipped as a cartridge or module for final assembly at a later time or different location. One preferred suspension cartridge has a weight adjust knob that moves the spring hanger in a fore-aft direction relative to the suspension cartridge frame to change the preload on the springs by changing the amount of preload spring tension. Thus, rotation of the weight adjust knob will enable operators of different weights to adjust the suspension to their preference.

The cartridge preferably also includes a height adjust knob used to move the entire cartridge relative to the ground of the seat or seat suspension so as to change the spacing between the top and bottom of the suspension. By doing so, the seat height can advantageously be adjusted. By doing so in this manner, seat height preferably can be adjusted substantially independently of weight adjustment and vice versa.

The cartridge can also have a damper that has one end attached to the spring cross beam and its other end attached to the roller or wheel pivot.

An advantage of the cartridge of this invention is that it can be used in combination with virtually any kind of a mechanism disposed between upper and lower seat pans of a seat and seat suspension assembly. For example, the cartridge can be used in combination with a four bar linkage, scissors linkage or just about any other kind of linkage that communicates with upper and lower seat pans.

The cartridge housing, the primary load channel, is a structural member that houses all of the components necessary to store and deliver energy to the suspension. In addition the primary load channel simultaneously houses all of the components necessary to provide a vertical adjustment for the suspension. The energy cartridge assembly is a freestanding element. The forces generated by preloaded spring elements are resisted by components within the energy cartridge assembly and are not imparted to the suspension structure. The suspension structure is thereby only subjected to external forces applied which in part cause a vertical displacement of the assembly and the opposing reaction force imparted by the energy cartridge assembly to prevent collapse of the suspension top plate via a bell crank or other such linkage. The bell crank assembly is a tertiary link. Pivotally attached to the cartridge housing item 1 the bell crank assembly provides an interface between the suspension plate and the energy source via a roller. The bell crank also contains a cross member (spring retainer shaft) that acts as a spring attachment point. The opposing end of the spring is affixed to a carrier (spring hanger bracket) that is axially fixed to a rotating shaft element (weight adjust shaft—adjuster rod) via a threaded element (e.g., weight adjust nut). There is also provided an attachment point for a vibration-damping element such as a damper, which is connected at the opposite end to a fixed point on the cartridge housing. A weight adjust knob is axially fixed to the weight adjustment shaft and pinned to the shaft via a pin preventing translation of the knob along the shaft and providing a means to transfer the torque applied to the weight adjust knob to the weight adjust shaft. A torque can be applied to the weight shaft via the weight knob thus rotating the shaft and subsequently translating the weight adjust nut. This provides the motion necessary to elongate the spring elements, which provides additional preload to the cartridge, allowing the suspension to support larger payloads without altering the static height of the suspension.

In the case where the energy storage assembly includes extension springs, a stop means must be provided limiting the minimum length of the springs. In the case where the energy storage assembly includes compression springs, a stop or another such stop means is preferably provided to limit the maximum length of the springs. This way the preloaded assembly can be moved as a unit to provide height adjust.

A height adjust knob is axially contained within the front wall of the energy cartridge via screw threads on the knob and mating threads on a nut affixed to the front formed tab of the energy cartridge housing. The threads provide a means to translate the height adjust knob with respect to the energy cartridge front wall. The height adjust knob is trapped between the weight adjust knob and the energy cartridge front formed tab and provides sufficient clearance for the weight adjust shaft to rotate freely about its inside diameter. Because the weight adjust knob is fixed to the weight adjust shaft, stored energy within the cartridge can be distributed through the energy cartridge front wall to the two knobs. Thus a translation of the height adjust knob with respect to the energy cartridge front wall allows the weight shaft to translate longitudinally without altering the amount of stored energy in the cartridge. The height adjustment yoke which is axially, and pivotally attached to the spring retainer shaft acts as a receptacle for the weight adjust shaft on the end opposite of the energy cartridge housing front formed tab. The weight adjust shaft delivers a compressive force, e.g., spring energy, to a blind hole contained within the yoke. Thus as the height adjust knob translates due to an externally applied torque imparted by the operator, the yoke is simultaneously translated longitudinally thereby causing the bell crank to rotate about the fixed pivot. This is the height adjustment functionality.

The suspension has upper and lower housings which correspond to a platform and a base. The energy cartridge is attached to one of the two suspension housings. The energy cartridge can be affixed to the suspension plate preferably with rivets, tabs, or threaded fasteners. In a preferred embodiment, rivets are used to minimize the time required to assemble the energy cartridge assembly to the housing. The linkage is a scissors that connects the upper and lower suspension plates. The scissors linkage constrains the housings in a manner to limit the motion of the upper housing with respect to the lower housing to a translation in the vertical direction.

Whereas existing suspensions are specific to mechanisms that load scissors arms, the invention described above and in the drawings appended hereto depict a moveable spring system that can operate on plate-to-plate energy devices, independent of the main suspension linkage whether the linkage be a scissors linkage, a 4-bar linkage, or another type of linkage.

Reference is also made to commonly owned U.S. Pat. Nos. 5,794,911, and 5,927,679, the disclosures of both of which are expressly incorporated herein.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A vehicle seat suspension comprising:
  a base;
  a seat supporting platform;

a suspension module that communicates with the base and the seat supporting platform that includes a frame supported by one of the base and seat supporting platform, a pivotable arm disposed between the base and platform, and a biasing element that cooperates with the frame and the pivotable arm in opposing suspension collapse;

wherein the pivotable arm comprises a bellcrank arm;

wherein the frame comprises a fore-aft extending tubular housing; and wherein the biasing element comprises at least one fore-aft extending spring carried by the tubular housing with the at least one fore-aft extending spring being movable relative to the tubular housing without substantially changing spring tension during height adjustment and being movable relative to the tubular housing by changing spring tension during weight adjustment.

2. The vehicle seat suspension of claim 1 further comprising a pivotable scissors linkage arrangement disposed between the base and the seat supporting platform and wherein base and the seat supporting platform each comprise a pan and wherein the suspension module is mounted to one of the base and the seat supporting platform.

3. The vehicle seat suspension of claim 2 wherein the tubular housing has a front end disposed toward a front of the vehicle seat suspension and a rear end disposed toward a rear of the vehicle seat suspension, the bellcrank arm is pivotally operated connected by a pivot to the tubular housing adjacent the rear end of the tubular housing with the pivot operatively connected to the at least one fore-aft extending spring and being displaceable relative to the tubular housing during suspension operation.

4. The vehicle seat suspension of claim 3 wherein the suspension module is constructed and arranged such that height adjustment is substantially independent of weight adjustment and weight adjustment is substantially independent of height adjustment.

5. The vehicle seat suspension of claim 1 wherein the suspension module comprises a pair of the fore-aft extending springs, a damper, and a roller, wherein the tubular housing has a mount disposed inside the housing to which the damper attaches at one end, wherein the other end of the damper attaches to the bellcrank arm, and wherein the roller is rotatively carried by the bellcrank arm.

6. The vehicle seat suspension of claim 1 wherein the suspension module is engageable with one of the base and platform without any weld.

7. A vehicle seat suspension comprising:

a base;

a seat supporting platform;

a suspension module that communicates with the base and the platform that comprises a frame carried by one of the base and the seat supporting platform, a pivotable arm disposed between the base and the seat supporting platform, and at least one biasing element that operably cooperates with the frame and the pivotable arm in opposing suspension collapse;

wherein the suspension module is constructed and arranged to enable height and weight adjustment of a seat occupant;

wherein the suspension module is engageable with one of the base and the seat supporting platform without any weld; and wherein the suspension module is preassembled as a unit before being assembled to part of the vehicle seat suspension.

8. The vehicle seat suspension of claim 7 wherein the frame of the suspension module comprises a tubular suspension module housing that has an elongate wall that is engageable with one of the base and platform and that has a pair of spaced apart and generally parallel sidewalls extending outwardly from the elongate wall.

9. A vehicle seat suspension comprising:

a base;

a platform;

a linkage arrangement disposed between the base and the platform;

a suspension arrangement that is cooperable with one of the base and the platform, the suspension module further comprising a housing having an elongate wall that is engageable with one of the base and the platform and a plurality of spaced apart sidewalls extending outwardly from the elongate wall and further comprising a damper having at least a portion of which that is disposed in the housing between the sidewalls and adjacent the elongate wall.

10. The vehicle seat suspension of claim 9 wherein the suspension arrangement comprises a suspension module having a movable suspension arm arrangement that is releasably carried by the housing wherein the damper is pivotally mounted at one end to the housing of the suspension module and the damper is pivotally mounted at its other end to a movable arm of the movable suspension arm arrangement.

11. The vehicle seat suspension of claim 10 further comprising at least one biasing element in operable communication with the housing and the movable arm of the movable suspension arm arrangement opposing suspension collapse, wherein each housing sidewall further comprises at least one notch that each pivotably supports a portion of the movable suspension arm arrangement, and wherein the housing is fixable to one of the base and the platform and the movable arm of the movable suspension arm arrangement is rotatable relative to the housing and applies a force against the other one of the base and platform in opposing suspension collapse.

12. The vehicle seat suspension of claim 10 wherein the suspension arrangement further comprises a spring that cooperates with the movable suspension arm arrangement, a manipulable weight adjust handle, an elongate adjuster rod having at least a portion disposed in the housing and which cooperates with the handle and the spring to enable spring tension to be changeable when the weight adjust handle is manipulated, and wherein the linkage arrangement comprises a plurality of spaced apart and parallel scissors linkages.

13. A vehicle seat suspension comprising:

a base that comprises a lower seat pan;

a seat platform that comprises an upper seat pan;

a suspension module in operable communication with at least one of the upper and lower seat pans, the suspension module comprising a frame that supports a bell crank arm assembly having a bell crank arm extending outwardly from the frame that is displaceable relative to the frame; a spring hanger that cooperates with at least one coil spring; an adjuster rod that cooperates with the spring hanger; a weight adjust handle that cooperates with the adjuster rod; and a height adjust handle that cooperates with the adjuster rod;

wherein manipulation of the weight adjust handle rotates the adjuster rod changing spring tension for suspension weight adjust; and wherein manipulation of the height adjust handle displaces the adjuster rod and the bell crank arm for suspension height adjust.

14. The vehicle seat suspension of claim 13 wherein the suspension module is carried by one of the upper and lower seat pans and further comprising a truncated roller rotatively mounted to the bell crank arm and that is in communication with the other one of the upper and lower seat pans, wherein the truncated roller has a curvilinear contact portion that rotates during suspension travel and a flat re-indexing portion that reorients the truncated roller when it functions as a contact portion, and further comprising a scissors linkage arrangement disposed between the upper seat pan and the lower seat pan.

15. A vehicle seat suspension comprising:
a base;
a seat supporting platform;
a suspension module comprising an elongate tubular frame that is fixable to one of the base and the seat supporting platform without any weld and that comprises a frame, a pivotable arm pivotally extending from the frame that is disposed between the base and the seat supporting platform, a biasing element that cooperates with the pivotable arm in opposing suspension collapse, and a truncated roller carried by the pivotable arm and that is in operable communication with the other one of the base and the platform that rolls back and forth during suspension operation.

16. A vehicle seat suspension comprising:
a base;
a seat supporting platform;
a suspension arrangement that is carried by one of the base and the seat supporting platform and that comprises an outwardly extending pivotable arm that is located between the base and the seat supporting platform, a plurality of springs that each cooperate with the pivotable arm in opposing suspension collapse, and a truncated roller carried by the pivotable arm at or adjacent a free end of the pivotable arm and that is in rotatable communication with the other one of the base and the platform, wherein the truncated roller has an angular extent of no less than about 30° and no greater than about 270°.

17. A vehicle seat suspension comprising:
a base;
a seat supporting platform; and
a suspension arrangement carried by one of the base and the platform that comprises a truncated rotatable roller that is in communication with the other one of the base and the platform and that rolls or rocks back and forth during suspension operation.

18. The vehicle seat suspension of claim 17 wherein the suspension arrangement is disposed between the base and platform and wherein the suspension arrangement further comprises a suspension arm that carries the truncated roller and that has an abutment against which a portion of the truncated roller carried by the suspension arm bears thereby limiting roller rotation during suspension operation.

19. The vehicle seat suspension of claim 18 wherein the abutment comprises a slot and the portion of the roller carried by the suspension arm comprises an outwardly extending boss that is received in the slot.

20. The vehicle seat suspension of claim 17 wherein the suspension arrangement comprises a suspension module fixed to either the base or the platform with the suspension module including a suspension arm assembly that comprises the suspension arm and which cooperates with at least one coil spring carried by the module in opposing suspension collapse; a weight adjust assembly comprised of the at least one coil spring that is coupled by a coupling tube and a coupling clip to a manually operable weight adjuster; and further comprising a linkage arrangement disposed between the base and the platform.

21. The vehicle seat suspension of claim 1 wherein the suspension arrangement comprises a suspension arm assembly that is carried by one of the base and the platform that is in communication with a cam and follower arrangement.

22. The vehicle seat suspension of claim 21 wherein the cam comprises a contoured wedge carried by the other one of the base and the platform and the follower comprises a roller that rides along the contoured wedge during suspension operation.

23. The vehicle seat suspension of claim 22 wherein the contoured wedge comprises a ramp and the roller comprises a circular wheel.

24. The vehicle seat suspension of claim 22 wherein the contoured wedge comprises a ramp and the roller is generally U-shaped.

25. A vehicle seat suspension comprising:
a base;
a seat carrying platform;
a suspension arrangement carried by one of the base and the platform that comprises at least one biasing element and a suspension arm assembly that includes a pivotable arm extending outwardly toward the other one of the base and the platform that cooperates with the at least one biasing element opposing suspension collapse and further comprising a cam carried by the other one of the base and the platform that cooperates with the pivotable arm during suspension operation permitting relative movement therebetween and that is contoured so as to affect load-deflection characteristics of the suspension.

26. A vehicle seat suspension comprising:
a base;
a seat supporting platform;
a suspension linkage arrangement;
a suspension arrangement that communicates with the base and the platform and which opposes suspension collapse, the suspension arrangement comprising a rotatable bell crank arm spaced therefrom that extends outwardly toward one of the base and the platform;
a cam carried by the one of the base and the platform that cooperates with the bell crank arm of the suspension arrangement and is constructed and arranged to affect suspension load-deflection characteristics.

27. The vehicle seat suspension of claim 26 wherein the cam comprises a ramp that is fixed to one of the base and the platform and cooperation between the bell crank arm and the ramp occurs during relative movement therebetween.

28. The vehicle seat suspension of claim 26 wherein the cam has a substantially linear profile that produces a substantially linear suspension load-deflection curve.

29. The vehicle seat suspension of claim 26 wherein the bell crank arm is carried by the other one of the base and the platform, cooperation between the bell crank arm and the cam occurs during relative movement therebetween via displacement of an end portion of the bell crank arm along the cam and wherein the linkage arrangement comprises a scissors linkage arrangement that is disposed between the base and the platform.

30. A vehicle seat suspension comprising:
a base;
a seat supporting platform;

a cam carried by one of the base and the platform; and a bell crank suspension module that is fixable to the other one of the base and the platform, the bell crank suspension module comprising a rotatively displaceable arm extending outwardly therefrom which has a roller capable of riding along at least a portion of the cam during suspension operation.

31. The vehicle seat suspension of claim 30 wherein the cam comprises a ramp and the roller comprises a circular wheel.

32. The vehicle seat suspension of claim 30 wherein the roller has an angular extent of less than 360° such that it comprises a truncated roller and which rolls back and forth along the cam during suspension operation.

33. The vehicle seat suspension of claim 30 wherein the roller comprises a roller that has an angular extent of less than 360° and which has a radius of at least 15 mm.

34. The vehicle seat suspension of claim 30 wherein the cam has a substantially linear cam surface that is upraised relative to the one of the base and the platform and that has an angle of inclination of between 0° and 25°.

35. The vehicle seat suspension of claim 30 where the cam has a minimum height at its highest point of at least 5 mm.

36. A vehicle seat suspension comprising:

a base;

a seat supporting platform;

a cam carried by one of the base and the platform; and a bell crank suspension arrangement carried by the other one of the base and the platform and which has at least one biasing element and a truncated roller that rides along the cam during suspension operation and which rolls in one direction during suspension collapse and rolls in another direction during suspension expansion.

37. A vehicle seat suspension comprising:

a base;

a seat supporting platform;

a bell crank suspension arrangement fixed to one of the base and seat platform, the bell crank suspension arrangement comprising a housing carrying at least one biasing element, at least one bell crank arm, a weight adjust assembly, and a height adjust assembly, and further comprising a damper carried by the at least one bell crank arm.

38. The vehicle seat suspension of claim 37 further comprising a roller carried by the bell crank arm and wherein the damper has one end pivotally mounted to the at least one bell crank arm and the other end pivotally mounted pivotally mounted to the bell crank suspension housing.

39. The vehicle seat suspension of claim 37 wherein the bell crank suspension housing is of tubular construction and wherein the damper is disposed in the bell crank suspension housing and is operably connected to at least one of the weight adjust assembly and the height adjust assembly.

40. The vehicle seat suspension of claim 37 wherein the weight adjust assembly is constructed and arranged to enable suspension weight adjustment without substantially affecting height adjustment and the height adjust assembly is constructed and arranged to enable suspension height adjustment without substantially affecting weight adjustment.

41. The vehicle seat suspension of claim 37 further comprising a truncated roller rotatively mounted to the at least one bell crank arm.

42. A vehicle seat suspension comprising:

a base;

a seat supporting platform;

a suspension module that is mountable to one of the base and the seat supporting platform without any weld with the suspension module comprising a weight adjust assembly and a weight adjust assembly that includes at least one biasing element that is movable relative to the base and the seat supporting platform, at least one bell crank arm, and a rotatable roller carried by the arm that operably communicates with the other one of the base and seat supporting platform; and wherein the weight adjust assembly is constructed and arranged to enable suspension weight adjustment without affecting suspension height adjustment and the height adjust assembly is constructed and arranged to enable suspension height adjustment without affecting suspension weight adjustment.

43. A vehicle seat suspension comprising:

a base;

a seat supporting platform;

a preassembled suspension module that is mountable to one of the base and the seat supporting platform comprising a height adjust assembly that includes at least one spring, at least one bell crank arm, and a truncated roller carried by the arm disposed in opposition with the other one of the base and the seat supporting platform; and wherein the height adjust assembly has a pair of height adjust limits and is infinitely adjustable between the height adjust limits.

44. A vehicle seat suspension comprising:

a base;

a seat supporting platform;

a suspension arrangement carried by one of the base and the seat supporting platform that comprises a weight adjust assembly and a height adjust assembly that includes at least one biasing element, at least one bell crank arm, and a truncated roller carried by the arm that is rotatable relative to the bell crank arm;

wherein the weight adjust assembly has a pair of weight adjust limits and is infinitely adjustable between the weight adjust limits; and wherein the height adjust assembly has a pair of height adjust limits and is infinitely adjustable between the height adjust limits.

45. A vehicle seat suspension comprising:

a base;

a seat supporting platform;

a suspension arrangement that communicates with the base and the platform, the suspension arrangement including an elongate and fore-aft extending suspension component mount of one of the base and the platform generally centrally located relative to the one of the base and the platform and extending outwardly therefrom toward the other one of the base and the platform, the suspension component mount (a) carrying a pair of generally parallel and fore-aft extending elongate biasing elements, (b) pivotally carrying at least one bell crank arm that extends outwardly toward the other one of the base and the platform, and (c) pivotally carrying a damper disposed between the biasing elements that is pivotally connected to the at least one the bell crank arm and that pivotally cooperates with the suspension component mount; and a linkage arrangement disposed between the base and the platform and spaced from the suspension arrangement.

46. The vehicle seat suspension of claim 45 wherein the damper is parallel with the biasing elements and the biasing elements and the damper all extend generally in a fore to aft direction.

47. A vehicle seat suspension comprising:
a base;
a seat supporting platform;
a suspension module that communicates with the base and the platform, the suspension module comprising:
  a suspension housing;
  a bell crank arm pivotally mounted to the suspension housing along a first pivot;
  a spring hanger movable relative to the suspension housing along a guide thereof, a spring retainer spaced from the spring hanger and engaging the bell crank arm at a second pivot defining a moment arm relative to the first pivot, and a plurality of springs disposed between the spring hanger and the spring retainer with each spring having one of its ends in engagement with the spring hanger and the other of its ends in engagement with the spring retainer; and
  a damper having one end mounted to the suspension housing and the other end mounted to the bell crank arm.

48. A vehicle seat suspension comprising:
a base;
a seat supporting platform;
a linkage arrangement disposed between the base and the platform;
a preassembled suspension module that is fixable to one of the base and platform, the suspension module comprising:
  a bell crank arm pivotally mounted at a first pivot and operably cooperable with the other one of the base and the platform; and
  a weight adjust assembly that includes at least one biasing element in operable communication at or adjacent one end with the bell crank arm at a second pivot spaced from the first pivot defining a moment arm relative to the first pivot and in operable communication at or adjacent its other end to the one of the base and the platform, and a biasing element preload adjuster that is adjustable for providing suspension weight adjustment.

49. A preassembled suspension module for a vehicle seat suspension comprising:
a suspension module housing fixable to a part of the vehicle seat suspension that comprises:
  a plurality of biasing elements carried by the suspension module housing that are displaceable relative to the suspension module housing form enabling one of height adjustment and weight adjustment; and
  a bell crank suspension arm pivotally carried by the suspension module housing and in cooperation with the plurality of biasing elements opposing vehicle seat suspension collapse.

50. A suspension module for a vehicle seat suspension comprising:
a suspension module housing that is fixable either to a seat supporting platform or a base;
a bell crank arm pivotally attached to the housing at a first pivot;
a biasing element hanger disposed in a slot in the housing that guides movement of the hanger relative to the housing, a biasing element retainer attached to the bell crank arm at a second pivot, and at least one biasing element in operable communication with the hanger and the retainer; and
a damper that is pivotally attached to the housing and that is pivotally attached to the crank arm.

51. A suspension module for a vehicle seat suspension comprising:
a suspension module housing that is fixable to one of a seat supporting platform and a base;
a bell crank arm pivotally attached to the housing at a first pivot at or adjacent one end and having a roller rotatively attached at or adjacent the other end that cooperates with the other one of the seat supporting platform and the base;
a biasing element hanger disposed in a slot in the housing that guides movement of the hanger relative to the housing, a biasing element retainer attached to the bell crank arm at a second pivot, and at least one biasing element in operable communication with the hanger and the retainer;
a weight adjuster constructed and arranged to enable the distance between the hanger and the retainer to be changed to change biasing element preload; and
a height adjuster constructed and arranged to displace the retainer to change suspension height.

52. A suspension module for a vehicle seat suspension comprising:
a suspension module frame that is fixable to one of a seat supporting platform and a base;
a bell crank arm pivotally attached to the frame at a first pivot at or adjacent one end of the bell crank arm;
a biasing element hanger carried by the frame, a biasing element retainer attached to the bell crank arm at a second pivot spaced from the first pivot, and at least one biasing element in operable communication with the hanger and the retainer; and
a height adjuster constructed and arranged to displace the retainer to change suspension height changing an angle of the bell crank arm relative to the frame.

53. A suspension module for a vehicle seat suspension comprising:
a tubular suspension module housing that is fixable to one of a seat supporting platform and a base;
a bell crank arm pivotally attached to the housing at a first pivot at or adjacent one end and having a roller rotatively attached at or adjacent the other end that cooperates with the other one of the seat supporting platform and the base;
a biasing element hanger disposed in a slot in the housing that guides movement of the hanger relative to the housing, a biasing element retainer attached to the bell crank arm at a second pivot, and at least one biasing element in operable communication with the hanger and the retainer;
a weight adjuster constructed and arranged to enable the distance between the hanger and the retainer to be changed to change biasing element preload;
a height adjuster constructed and arranged to displace the retainer to change suspension height; and
a damper having at least a portion disposed in the housing and attached thereto and having at least portion extending alongside the bell crank arm and attached thereto.

54. A suspension module for a vehicle seat suspension comprising:
- a suspension module frame that is fixable to one of a seat supporting platform and a base;
- a bell crank arm pivotally attached to a housing at a first pivot at or adjacent one end and having a truncated roller rotatively attached at or adjacent the other end that cooperates with the other one of the seat supporting platform and the base; and
- a biasing element carried by the housing that cooperates with the bell crank arm.

* * * * *